United States Patent
Park et al.

(10) Patent No.: US 11,903,081 B2
(45) Date of Patent: Feb. 13, 2024

(54) METHOD AND DEVICE FOR PERFORMING SL DRX OPERATION IN NR V2X

(71) Applicant: LG ELECTRONICS INC., Seoul (KR)

(72) Inventors: Giwon Park, Seoul (KR); Hanbyul Seo, Seoul (KR); Seungmin Lee, Seoul (KR); Seoyoung Back, Seoul (KR); Jongwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/112,418

(22) Filed: Feb. 21, 2023

(65) Prior Publication Data

US 2023/0209648 A1  Jun. 29, 2023

Related U.S. Application Data

(63) Continuation of application No. PCT/KR2021/014934, filed on Oct. 22, 2021.

(Continued)

(30) Foreign Application Priority Data

Dec. 8, 2020 (KR) .................. 10-2020-0170656

(51) Int. Cl.
*H04W 76/28* (2018.01)
*H04W 72/25* (2023.01)
*H04W 92/18* (2009.01)

(52) U.S. Cl.
CPC .......... *H04W 76/28* (2018.02); *H04W 72/25* (2023.01); *H04W 92/18* (2013.01)

(58) Field of Classification Search
CPC ...... H04W 76/28; H04W 72/25; H04W 92/18
See application file for complete search history.

(56) References Cited

U.S. PATENT DOCUMENTS

2020/0296668 A1*  9/2020  Xu ................... H04W 52/0216
2021/0084660 A1*  3/2021  Taherzadeh Boroujeni ...............
                                                          H04L 5/0057

(Continued)

FOREIGN PATENT DOCUMENTS

CN          111556590 A      8/2020
CN          111699723 A      9/2020

(Continued)

OTHER PUBLICATIONS

OPPO, "Power saving mechanisms for NR SL", R1-2006009, 3GPP TSG RAN WG1 #102-e, e-Meeting, Aug. 17-28, 2020, see sections 1 and 2.2; and figure 1.

(Continued)

*Primary Examiner* — Parth Patel
(74) *Attorney, Agent, or Firm* — BRYAN CAVE LEIGHTON PAISNER LLP

(57) ABSTRACT

Disclosed is a method for operating a first device (100) in a wireless communication system. The method may comprise the steps in which: resource selection for a resource included in an active time of a sidelink (SL) discontinuous reception (DRX) configuration is performed on the basis of a second device (200) performing SL communication on the basis of the SL DRX configuration; and information related to the resource selected on the basis of the resource selection is transmitted to the second device (200).

9 Claims, 24 Drawing Sheets

Related U.S. Application Data

(60) Provisional application No. 63/104,508, filed on Oct. 22, 2020.

(56) References Cited

U.S. PATENT DOCUMENTS

| | | | | |
|---|---|---|---|---|
| 2021/0105126 A1* | 4/2021 | Yi | ................... | H04L 1/1671 |
| 2021/0105760 A1* | 4/2021 | Chen | ................... | H04L 5/0053 |
| 2021/0105827 A1* | 4/2021 | Tsai | ................... | H04B 7/088 |
| 2021/0227465 A1* | 7/2021 | Kung | ................... | H04W 72/569 |
| 2021/0227602 A1* | 7/2021 | Li | ................... | H04W 76/14 |
| 2021/0227604 A1* | 7/2021 | Huang | ................... | H04W 72/02 |
| 2022/0030661 A1* | 1/2022 | Jeong | ................... | H04W 72/20 |
| 2022/0346011 A1* | 10/2022 | Hong | ................... | H04W 72/20 |
| 2022/0353815 A1* | 11/2022 | Lin | ................... | H04W 52/0232 |
| 2022/0377709 A1* | 11/2022 | Zhao | ................... | H04W 76/14 |
| 2022/0394810 A1* | 12/2022 | Hong | ................... | H04W 24/08 |
| 2022/0394814 A1* | 12/2022 | Liu | ................... | H04L 1/1896 |
| 2023/0014303 A1* | 1/2023 | Di Girolamo | ................... | H04W 72/20 |
| 2023/0014777 A1* | 1/2023 | Liu | ................... | H04L 1/16 |
| 2023/0019322 A1* | 1/2023 | Liu | ................... | H04L 5/0094 |
| 2023/0020105 A1* | 1/2023 | Shin | ................... | H04W 72/542 |
| 2023/0023698 A1* | 1/2023 | Liu | ................... | H04W 72/0446 |
| 2023/0034294 A1* | 2/2023 | Zhang | ................... | H04W 52/0216 |
| 2023/0044818 A1* | 2/2023 | Su | ................... | H04W 4/40 |
| 2023/0056525 A1* | 2/2023 | Wang | ................... | H04W 52/0216 |
| 2023/0063472 A1* | 3/2023 | Freda | ................... | H04W 76/28 |
| 2023/0063943 A1* | 3/2023 | Ding | ................... | H04W 72/02 |
| 2023/0082194 A1* | 3/2023 | Liu | ................... | H04W 52/0216 370/310 |
| 2023/0091763 A1* | 3/2023 | Mohammad Soleymani | ................... | H04W 76/14 |
| 2023/0106109 A1* | 4/2023 | Zhang | ................... | H04W 72/25 370/336 |
| 2023/0111565 A1* | 4/2023 | Lee | ................... | H04W 72/12 370/329 |
| 2023/0127136 A1* | 4/2023 | Ding | ................... | H04W 72/02 370/330 |
| 2023/0156670 A1* | 5/2023 | Yoon | ................... | H04W 72/04 370/329 |
| 2023/0156745 A1* | 5/2023 | Zhao | ................... | H04W 72/25 370/330 |

FOREIGN PATENT DOCUMENTS

| | | |
|---|---|---|
| KR | 10-2019-0039101 A | 4/2019 |
| KR | 10-2020-0093517 A | 8/2020 |

OTHER PUBLICATIONS

Section 5.7 of 3GPP TS 38.321 V16.2.0.
Sections 8.3.1.1 and 8.4.1.1 of 3GPP TS 38.212 V16.2.0.

* cited by examiner

METHOD AND DEVICE FOR PERFORMING SL DRX OPERATION IN NR V2X

CROSS-REFERENCE TO RELATED APPLICATIONS

This application is a Continuation of International Application No. PCT/KR2021/014934, filed on Oct. 22, 2021, which claims the benefit of U.S. Provisional Application No. 63/104,508 filed on Oct. 22, 2020, and Korean Patent Application No. 10-2020-0170656 filed on Dec. 8, 2020, the contents of which are all hereby incorporated by reference herein in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

In an embodiment, an operation method of a first device 100 in wireless communication system is proposed. The method may comprise: performing resource selection for resources included in active time of a sidelink (SL) discontinuous reception (DRX) configuration, based on a second device performing SL communication based on the SL DRX configuration; and transmitting, to the second device, information related to resources selected based on the resource selection.

The user equipment (UE) may efficiently perform retransmission based on hybrid automatic repeat request (HARQ) feedback.

DETAILED DESCRIPTION

Figure 1:
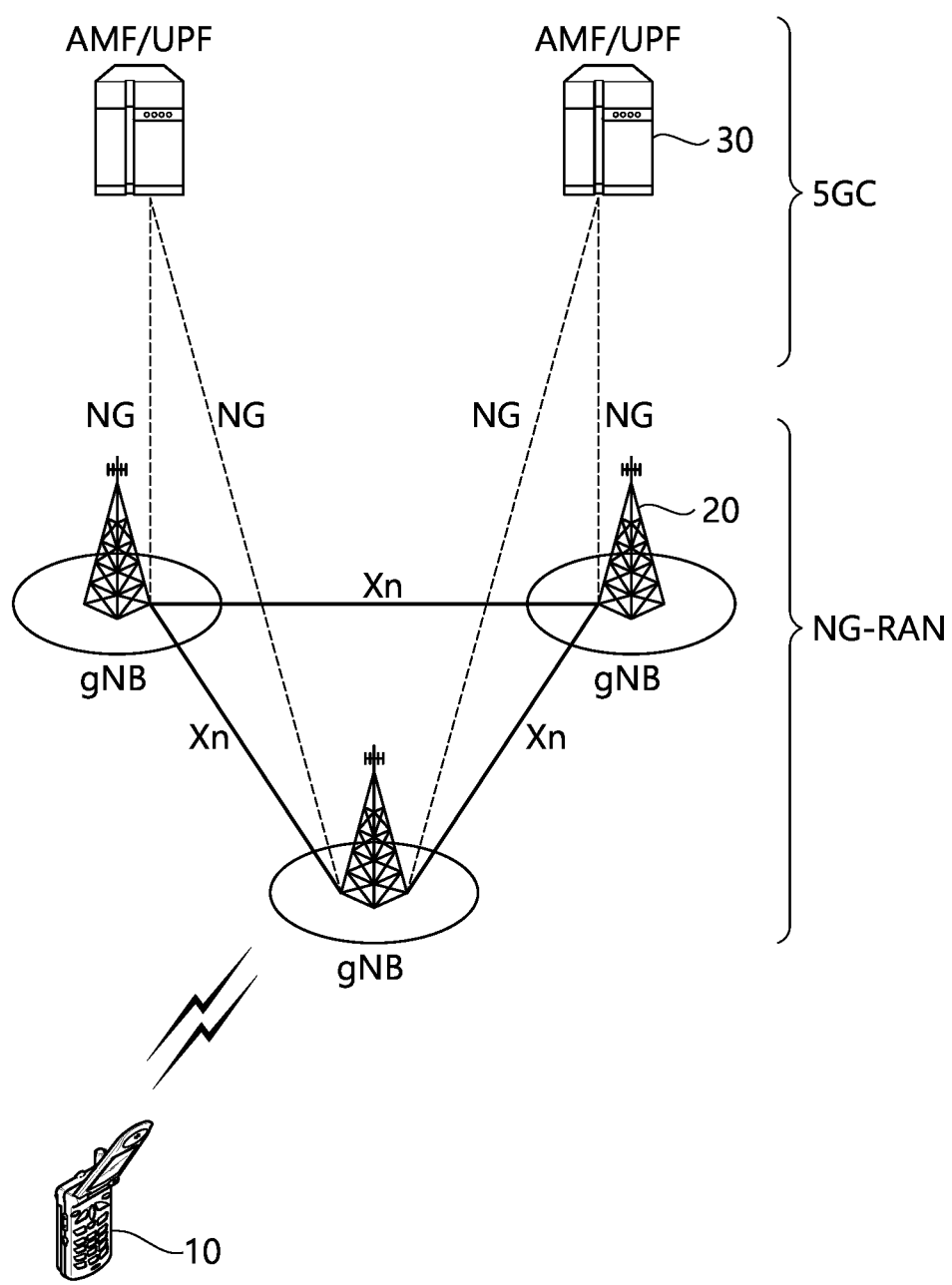
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if', or in case of may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in this specification, a wireless communication standard document published before the present specification is filed may be referred to.

FIG. 1 shows a structure of an NR system, based on an embodiment of the present disclosure. The embodiment of FIG. 1 may be combined with various embodiments of the present disclosure.

Referring to FIG. 1, a next generation-radio access network (NG-RAN) may include a BS providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
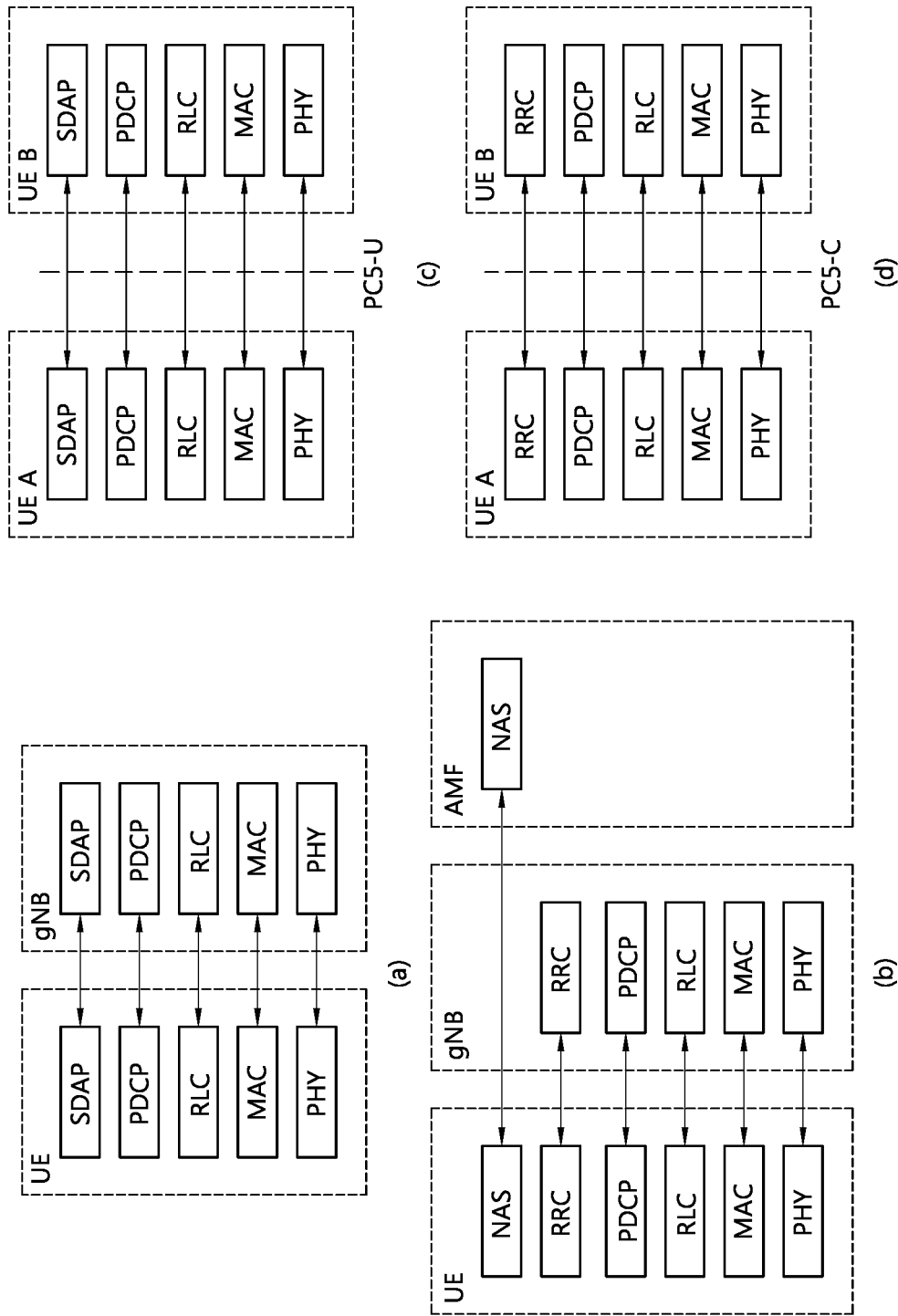
FIG. 2 shows a radio protocol architecture, based on an embodiment of the present disclosure.

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
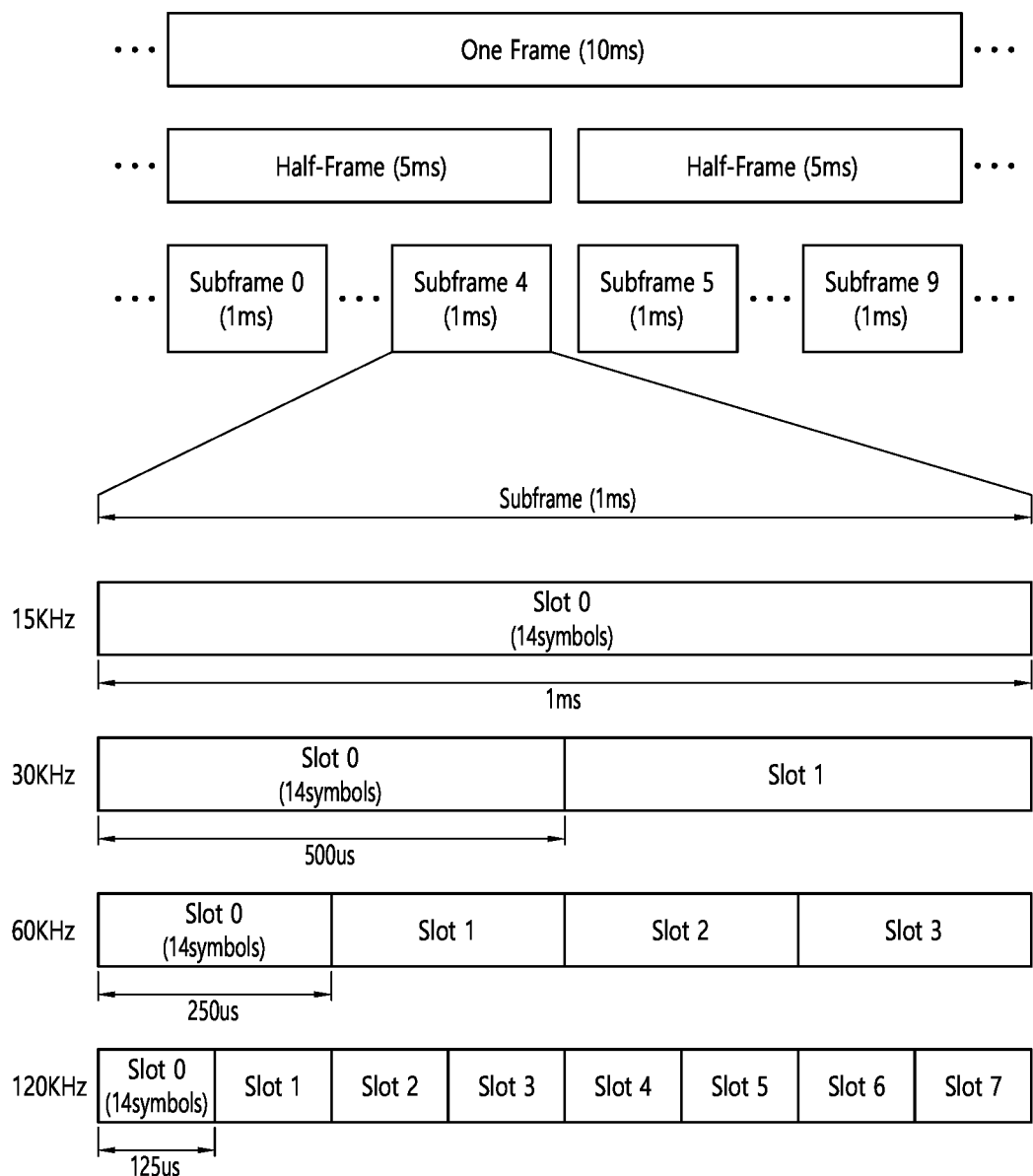
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 4:
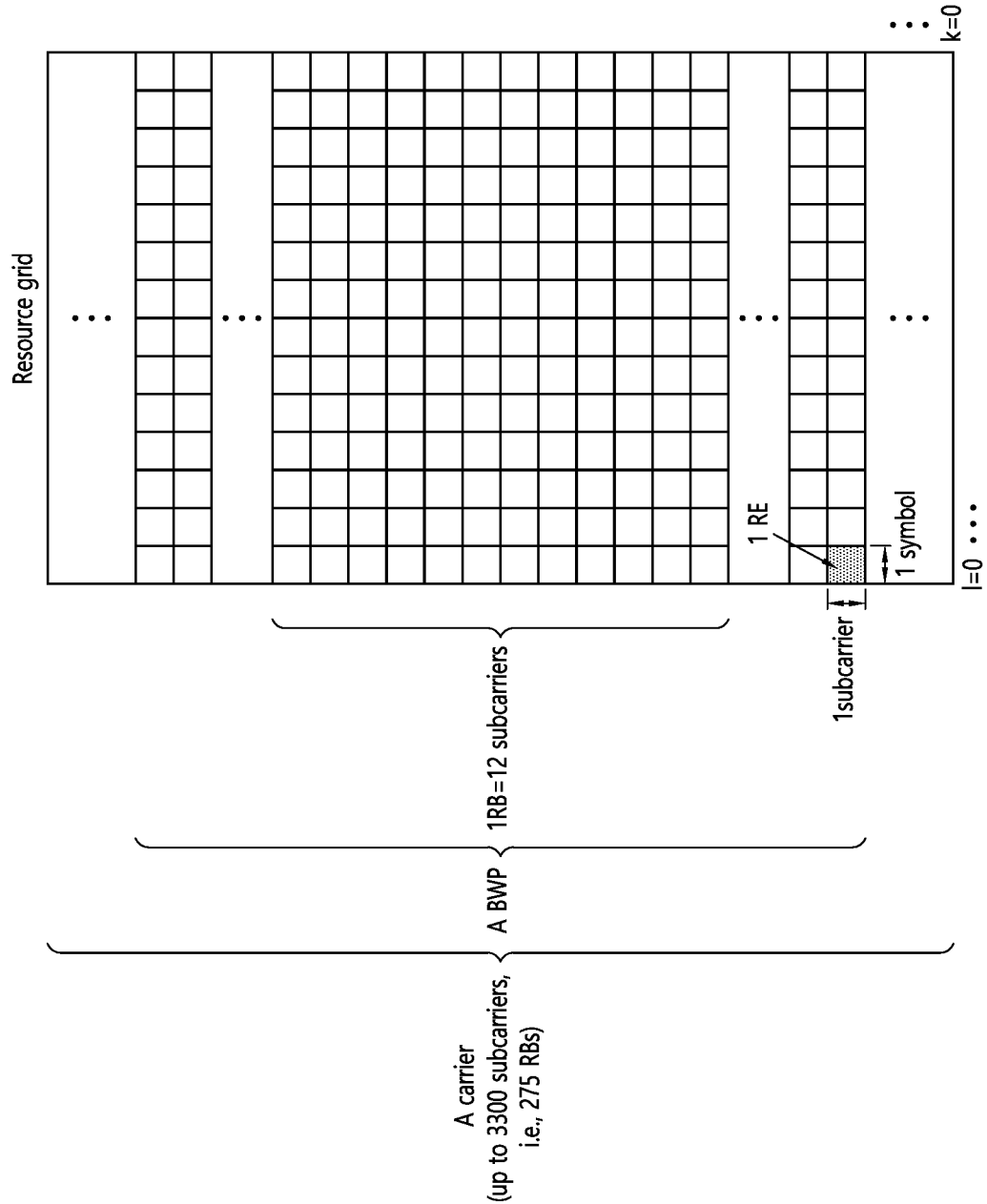
FIG. 4 shows a structure of a slot of an NR frame, based on an embodiment of the present disclosure.

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols. A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on).

A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 5:
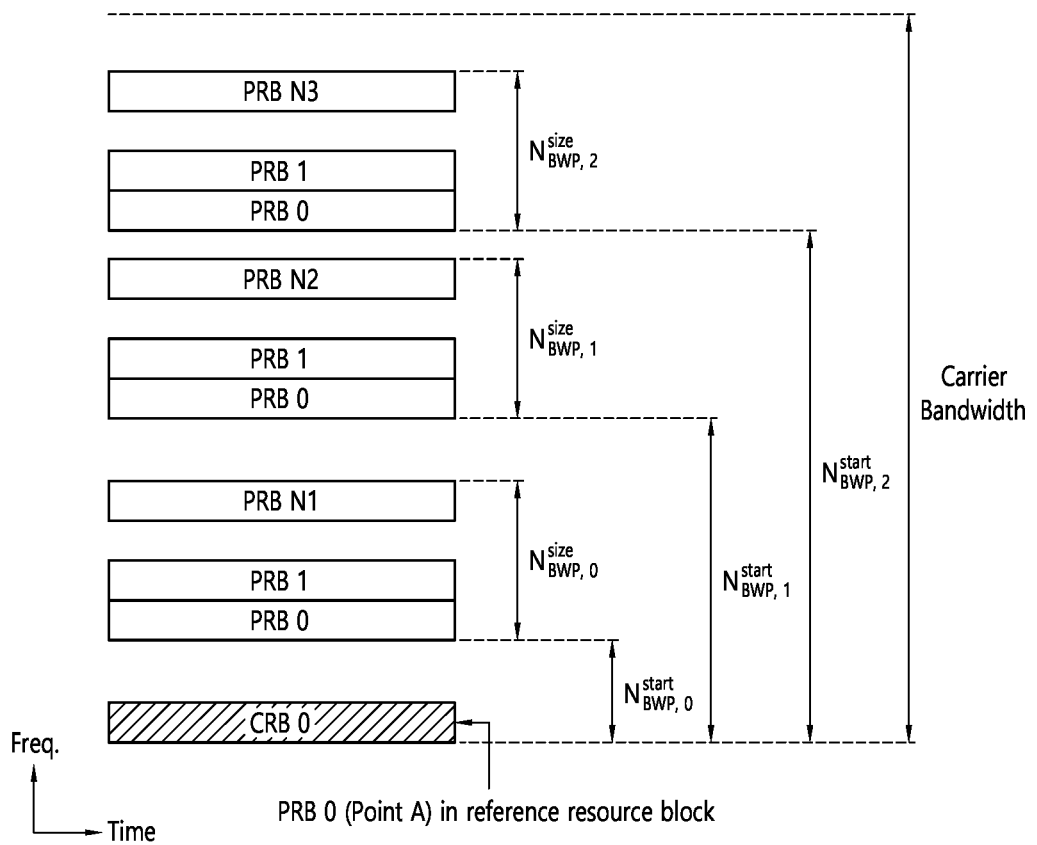
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SLspecific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
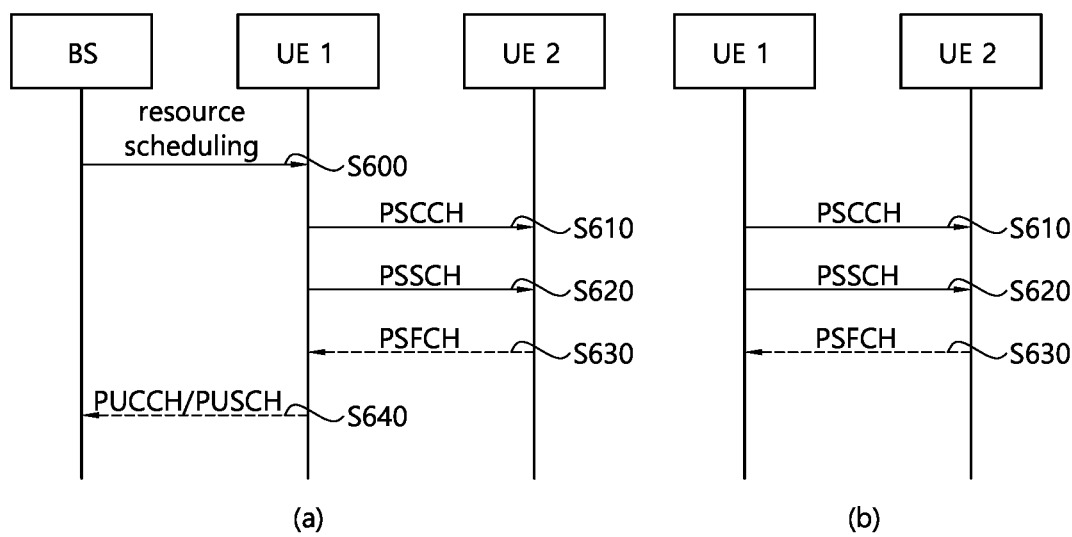
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or 1st-stage SCI) to a second UE based on the resource scheduling. In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or 1st-stage SCI) to a second UE by using the resource(s). In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE.

Referring to (a) or (b) of FIG. 6, for example, UE 1 may transmit SCI to UE 2 on a PSCCH. Or, for example, a first UE may transmit two consecutive SCI (e.g., 2-stage SCI) to a second UE on a PSCCH and/or PSSCH. In this case, a second UE may decode two consecutive SCI (e.g., 2-stage SCI) to receive a PSSCH from a first UE. In this specification, SCI transmitted on a PSCCH may be referred to as 1st SCI, 1st SCI, 1st-stage SCI or 1st-stage SCI format, and SCI transmitted on a PSSCH may be referred to as a 2nd SCI, 2nd SCI, 2nd-stage SCI or 2nd-stage SCI format. For example, a 1st-stage SCI format may include SCI format 1-A, and a 2nd-stage SCI format may include SCI format 2-A and/or SCI format 2-B. Table 5 shows an example of the 1st-stage SCI format.

TABLE 5

3GPP TS 38.212

8.3.1.1 SCI format 1-A
SCI format 1-A is used for the scheduling of PSSCH and $2^{nd}$-stage-SCI on PSSCH
The following information is transmitted by means of the SCI format 1-A:
- Priority - 3 bits as specified in clause 5.4.3.3 of [12, TS 23.287] and clause 5.22.1.3.1 of [8, TS 38.321].
- Frequency resource assignment -

$$\left\lceil \log_2\left(\frac{N^{SL}_{subChannel}(N^{SL}_{subChannel}+1)}{2}\right)\right\rceil$$

bits when the value of the higher layer parameter sl-MaxNumPerReserve is configured to 2; otherwise $$\left\lceil \log_2\left(\frac{N^{SL}_{subChannel}(N^{SL}_{subChannel}+1)(2N^{SL}_{subChannel}+1)}{6}\right)\right\rceil$$

bits when the value of the higher layer parameter sl-MaxNumPerReserve is configured to 3, as defined in clause 8.1.2.2 of [6, TS 38.214].
- Time resource assignment - 5 bits when the value of the higher layer parameter sl-MaxNumPerReserve is configured to 2; otherwise 9 bits when the value of the higher layer parameter sl-MaxNumPerReserve is configured to 3, as defined in clause 8.1.2.1 of [6, TS 38.214].
- Resource reservation period - $\lceil \log_2 N_{rsv\_period}\rceil$ bits as defined in clause 8.1.4 of [6, TS 38.214], where $N_{rsv\_period}$ is the number of entries in the higher layer parameter sl-ResourceReservePeriodList, if higher layer parameter sl-MultiReserveResource is configured; 0 bit otherwise.
- DMRS pattern - $\lceil \log_2 N_{pattern}\rceil$ bits as defined in clause 8.4.1.1.2 of [4, TS 38.211], where $N_{pattern}$ is the number of DMRS patterns configured by higher layer parameter sl-PSSCH-DMRS-TimePatternList.
  $2^{nd}$-stage SCI format - 2 bits as defined in Table 8.3.1.1-1.
- Beta_offset indicator - 2 bits as provided by higher layer parameter sl-BetaOffsets2ndSCI and Table 8.3.1.1-2.
- Number of DMRS port - 1 bit as defined in Table 8.3.1.1-3.
  Modulation and coding scheme - 5 bits as defined in clause 8.1.3 of [6, TS 38.214].
  Additional MCS table indicator - as defined in clause 8.1.3.1 of [6, TS 38.214]: 1 bit if one MCS table is configured by higher layer parameter sl-Additional-MCS-Table; 2 bits if two MCS tables are configured by higher layer parameter sl- Additional-MCS-Table; 0 bit otherwise.
  PSFCH overhead indication - 1 bit as defined clause 8.1.3.2 of [6, TS 38.214] if higher layer parameter sl-PSFCH-Period = 2 or 4; 0 bit otherwise.
- Reserved - a number of bits as determined by higher layer parameter sl-NumReservedBits, with value set to zero.

Table 6 shows an example of a 2nd-stage SCI format.

TABLE 6

3GPP TS 38.212

8.4.1.1 SCI format 2-A

SCI format 2-A is used for the decoding of PSSCH, with HARQ operation when HARQ-ACK information includes ACK or NACK, when HARQ-ACK information includes only NACK, or when there is no feedback of HARQ-ACK information.
The following information is transmitted by means of the SCI format 2-A:
HARQ process number - 4 bits as defined in clause 16.4 of [5, TS 38.213].
New data indicator - 1 bit as defined in clause 16.4 of [5, TS 38.213].
Redundancy version - 2 bits as defined in clause 16.4 of [6, TS 38.214].
Source ID - 8 bits as defined in clause 8.1 of [6, TS 38.214].
Destination ID - 16 bits as defined in clause 8.1 of [6, TS 38.214].
HARQ feedback enabled/disabled indicator - 1 bit as defined in clause 16.3 of [5, TS 38.213].
Cast type indicator - 2 bits as defined in Table 8.4.1.1-1.
CSI request - 1 bit as defined in clause 8.2.1 of [6, TS 38.214].
8.4.1.2 SCI format 2-B SCI format 2-B is used for the decoding of PSSCH, with HARQ operation when HARQ-ACK information includes only NACK, or when there is no feedback of HARQ-ACK information.
The following information is transmitted by means of the SCI format 2-B:

TABLE 6-continued

3GPP TS 38.212

HARQ process number - 4 bits as defined in clause 16.4 of [5, TS 38.213].
New data indicator - 1 bit as defined in clause 16.4 of [5, TS 38.213].
Redundancy version - 2 bits as defined in clause 16.4 of [6, TS 38.214].
Source ID - 8 bits as defined in clause 8.1 of [6, TS 38.214].
Destination ID - 16 bits as defined in clause 8.1 of [6, TS 38.214].
HARQ feedback enabled/disabled indicator - 1 bit as defined in clause 16.3 of [5, TS 38.213].
Zone ID - 12 bits as defined in clause 5.8.11 of [9, TS 38.331].
Communication range requirement - 4 bits determined by higher layer parameter sl-ZoneConfigMCR-Index.

Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource.

Referring to (a) of FIG. 6, in step S640, the first UE may transmit SL HARQ feedback to the base station through the PUCCH and/or the PUSCH.

Figure 7:
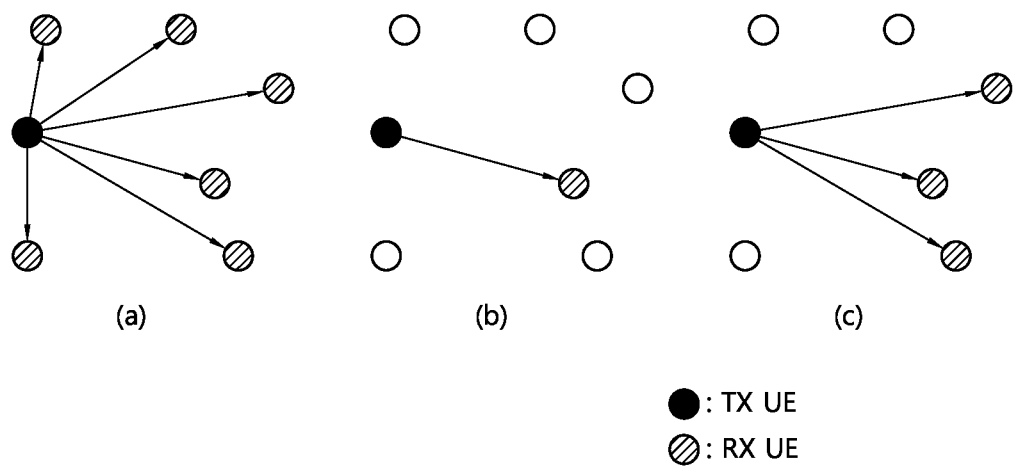
FIG. 7 shows three cast types, based on an embodiment of the present disclosure.

FIG. 7 shows three cast types, in accordance with an embodiment of the present disclosure. The embodiment of FIG. 7 may be combined with various embodiments of the present disclosure. Specifically, FIG. 7(*a*) shows broadcast-type SL communication, FIG. 7(*b*) shows unicast type-SL communication, and FIG. 7(*c*) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

In this specification, the "configure or define" wording may be interpreted as being (pre)configured (via pre-defined signaling (e.g., SIB, MAC signaling, RRC signaling)) from a base station or a network. For example, "A may be configured" may include "that a base station or network (pre-)configures/defines or informs A for a UE". Alternatively, the wording "configure or define" may be interpreted as being configured or defined in advance by a system. For example, "A may be configured" may include "A is configured/defined in advance by a system".

Referring to the standard document, some procedures and technical specifications related to the present disclosure are shown in Tables 7 to 10 below.

TABLE 7

3GPP TS 38.321 V16.2.0

Discontinuous Reception (DRX)

The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6].
NOTE 1: If Sidelink resource allocation mode 1 is configured by RRC, a DRX functionality is not configured.
RRC controls DRX operation by configuring the following parameters:
drx-onDurationTimer: the duration at the beginning of a DRX cycle;
drx-SlotOffset: the delay before starting the drx-onDurationTimer;
drx-InactivityTimer: the duration after the PDCCH occasion in which a PDCCH indicates a new UL or DL transmission for the MAC entity;
drx-RetransmissionTimerDL (per DL HARQ process except for the broadcast process): the maximum duration until a DL retransmission is received;
drx-RetransmissionTimerUL (per UL HARQ process): the maximum duration until a grant for UL retransmission is received;
drx-LongCycleStartOffset: the Long DRX cycle and drx-StartOffset which defines the subframe where the Long and Short DRX cycle starts;
drx-ShortCycleTimer (optional): the duration the UE shall follow the Short DRX cycle;
drx-ShortCycle (optional): the Short DRX cycle;
drx-HARQ-RTT-TimerDL (per DL HARQ process except for the broadcast process): the minimum duration before a DL assignment for HARQ retransmission is expected by the MAC entity;
drx-HARQ-RTT-TimerUL (per UL HARQ process): the minimum duration before a UL HARQ retransmission grant is expected by the MAC entity;
ps-Wakeup (optional): the configuration to start associated drx-onDurationTimer in case DCP is monitored but not detected;
ps-TransmitOtherPeriodicCSI (optional): the configuration to report periodic CSI that is not L1-RSRP on PUCCH during the time duration indicated by drx-onDurationTimer in case DCP is configured but associated drx-onDurationTimer is not started;
ps-TransmitPeriodicL1-RSRP (optional): the configuration to transmit periodic CSI that is L1-RSRP on PUCCH during the time duration indicated by drx-onDurationTimer in case DCP is configured but associated drx-onDurationTimer is not started.

TABLE 8

Serving Cells of a MAC entity may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The DRX parameters that are separately configured for each DRX group are: drx-onDurationTimer, drx-InactivityTimer. The DRX parameters that are common to the DRX groups are: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.
When a DRX cycle is configured, the Active Time for Serving Cells in a DRX group includes the time while:
drx-onDurationTimer or drx-InactivityTimer configured for the DRX group is running; or
drx-RetransmissionTimerDL or drx-RetransmissionTimerUL is running on any Serving Cell in the DRX group; or
ra-ContentionResolutionTimer (as described in clause 5.1.5) or msgB-ResponseWindow (as described in clause 5.1.4a) is running; or
a Scheduling Request is sent on PUCCH and is pending (as described in clause 5.4.4); or
a PDCCH indicating a new transmission addressed to the C-RNTI of the MAC entity has not been received after successful reception of a Random Access Response for the Random Access Preamble not selected by the MAC entity among the contention-based Random Access Preamble (as described in clauses 5.1.4 and 5.1.4a).
When DRX is configured, the MAC entity shall:
1> if a MAC PDU is received in a configured downlink assignment:
   2> start the drx-HARQ-RTT-TimerDL for the corresponding HARQ process in the first symbol after the end of the corresponding transmission carrying the DL HARQ feedback;
   2> stop the drx-RetransmissionTimerDL for the corresponding HARQ process.
1> if a MAC PDU is transmitted in a configured uplink grant and LBT failure indication is not received from lower layers:
   2> start the drx-HARQ-RTT-TimerUL for the corresponding HARQ process in the first symbol after the end of the first repetition of the corresponding PUSCH transmission;
   2> stop the drx-RetransmissionTimerUL for the corresponding HARQ process.
1> if a drx-HARQ-RTT-TimerDL expires:
   2> if the data of the corresponding HARQ process was not successfully decoded:
     3> start the drx-RetransmissionTimerDL for the corresponding HARQ process in the first symbol after the expiry of drx-HARQ-RTT-TimerDL.
1> if a drx-HARQ-RTT-TimerUL expires:
   2> start the drx-RetransmissionTimerUL for the corresponding HARQ process in the first symbol after the expiry of drx-HARQ-RTT-TimerUL.
1> if a DRX Command MAC CE or a Long DRX Command MAC CE is received:
   2> stop drx-onDurationTimer for each DRX group;
   2> stop drx-InactivityTimer for each DRX group.
1> if drx-InactivityTimer for a DRX group expires:
   2> if the Short DRX cycle is configured:
     3> start or restart drx-ShortCycleTimer for this DRX group in the first symbol after the expiry of drx-InactivityTimer;
     3> use the Short DRX cycle for this DRX group.
   2> else:
     3> use the Long DRX cycle for this DRX group.
1> if a DRX Command MAC CE is received:
   2> if the Short DRX cycle is configured:
     3> start or restart drx-ShortCycleTimer for each DRX group in the first symbol after the end of DRX Command MAC CE reception;
     3> use the Short DRX cycle for each DRX group.
   2> else:
     3> use the Long DRX cycle for each DRX group.
1> if drx-ShortCycleTimer for a DRX group expires:
   2> use the Long DRX cycle for this DRX group.
1> if a Long DRX Command MAC CE is received:
   2> stop drx-ShortCycleTimer for each DRX group;
   2> use the Long DRX cycle for each DRX group.
1> if the Short DRX cycle is used for a DRX group, and [(SFN x 10) + subframe number] modulo (drx-ShortCycle) = (drx-StartOffset) modulo (drx-ShortCycle):
   2> start drx-onDurationTimer for this DRX group after drx-SlotOffset from the beginning of the subframe.

TABLE 9

1> if the Long DRX cycle is used for this DRX group, and [(SFN x 10) + subframe number] modulo (drx-LongCycle) = drx-StartOffset:
   2> if DCP monitoring is configured for the active DL BWP as specified in TS 38.213 [6], clause 10.3:
     3> if DCP indication associated with the current DRX cycle received from lower layer indicated to start drx-onDurationTimer, as specified in TS 38.213 [6]; or
     3> if all DCP occasion(s) in time domain, as specified in TS 38.213 [6], associated with the current DRX cycle occurred
in Active Time considering grants/assignments/DRX Command MAC CE/Long DRX Command MAC CE received and Scheduling Request sent until 4 ms prior to start of the last DCP occasion, or within BWP switching interruption
length, or during a measurement gap, or when the MAC entity monitors for a PDCCH transmission on the search space indicated by recoverySearchSpaceId of the SpCell identified by the C-RNTI while the ra-Response Window is running (as specified in clause 5.1.4); or TABLE 9-continued

|  |  |
|---|---|
|  | 3> if ps-Wakeup is configured with value true and DCP indication associated with the current DRX cycle has not been received from lower layers:<br>    4> start drx-onDurationTimer after drx-SlotOffset from the beginning of the subframe.<br>2> else:<br>    3> start drx-onDurationTimer for this DRX group after drx-SlotOffset from the beginning of the subframe. |
| NOTE 2: | In case of unaligned SFN across carriers in a cell group, the SFN of the SpCell is used to calculate the DRX duration. |
| 1> | if a DRX group is in Active Time:<br>  2> monitor the PDCCH on the Serving Cells in this DRX group as specified in TS 38.213 [6];<br>  2> if the PDCCH indicates a DL transmission:<br>    3> start the drx-HARQ-RTT-TimerDL for the corresponding HARQ process in the first symbol after the end of the corresponding transmission carrying the DL HARQ feedback; |
| NOTE 3: | When HARQ feedback is postponed by PDSCH-to-HARQ_feedback timing indicating a non-numerical k1 value, as specified in TS 38.213 [6], the corresponding transmission opportunity to send the DL HARQ feedback is indicated in a later PDCCH requesting the HARQ-ACK feedback.<br>    3> stop the drx-RetransmissionTimerDL for the corresponding HARQ process.<br>    3> if the PDSCH-to-HARQ_feedback timing indicate a non-numerical k1 value as specified in TS 38.213 [6]:<br>      4> start the drx-RetransmissionTimerDL in the first symbol after the PDSCH transmission for the corresponding HARQ process.<br>  2> if the PDCCH indicates a UL transmission:<br>    3> start the drx-HARQ-RTT-TimerUL for the corresponding HARQ process in the first symbol after the end of the first repetition of the corresponding PUSCH transmission;<br>    3> stop the drx-RetransmissionTimerUL for the corresponding HARQ process.<br>  2> if the PDCCH indicates a new transmission (DL or UL) on a Serving Cell in this DRX group:<br>    3> start or restart drx-InactivityTimer for this DRX group in the first symbol after the end of the PDCCH reception.<br>  2> if a HARQ process receives downlink feedback information and acknowledgement is indicated:<br>    3> stop the drx-RetransmissionTimerUL for the corresponding HARQ process. |
| 1> | if DCP monitoring is configured for the active DL BWP as specified in TS 38.213 [6], clause 10.3; and |
| 1> | if the current symbol n occurs within drx-onDurationTimer duration; and |
| 1> | if drx-onDurationTimer associated with the current DRX cycle is not started as specified in this clause:<br>  2> if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this clause:<br>    3> not transmit periodic SRS and semi-persistent SRS defined in TS 38.214 [7];<br>    3> not report semi-persistent CSI configured on PUSCH;<br>    3> if ps-TransmitPeriodicL1-RSRP is not configured with value true:<br>      4> not report periodic CSI that is L1-RSRP on PUCCH.<br>    3> if ps-TransmitOtherPeriodicCSI is not configured with value true:<br>      4> not report periodic CSI that is not L1-RSRP on PUCCH. |

TABLE 10

|  |  |
|---|---|
| 1> | else:<br>  2> in current symbol n, if a DRX group would not be in Active Time considering grants/assignments scheduled on Serving Cell(s) in this DRX group and DRX Command MAC CE/Long DRX Command MAC CE received and Scheduling Request sent until 4 ms prior to symbol n when evaluating all DRX Active Time conditions as specified in this clause:<br>    3> not transmit periodic SRS and semi-persistent SRS defined in TS 38.214 [7] in this DRX group;<br>    3> not report CSI on PUCCH and semi-persistent CSI configured on PUSCH in this DRX group.<br>  2> if CSI masking (csi-Mask) is setup by upper layers:<br>    3> in current symbol n, if drx-onDurationTimer of a DRX group would not be running considering grants/assignments scheduled on Serving Cell(s) in this DRX group and DRX Command MAC CE/Long DRX Command MAC CE received until 4 ms prior to symbol n when evaluating all DRX Active Time conditions as specified in this clause; and<br>      4> not report CSI on PUCCH in this DRX group. |
| NOTE 4: | If a UE multiplexes a CSI configured on PUCCH with other overlapping UCI(s) according to the procedure specified in TS 38.213 [6] clause 9.2.5 and this CSI multiplexed with other UCI(s) would be reported on a PUCCH resource outside DRX Active Time of the DRX group in which this PUCCH is configured, it is up to UE implementation whether to report this CSI multiplexed with other UCI(s). |

Regardless of whether the MAC entity is monitoring PDCCH or not on the Serving Cells in a DRX group, the MAC entity transmits HARQ feedback, aperiodic CSI on PUSCH, and aperiodic SRS defined in TS 38.214 [7] on the Serving Cells in the DRX group when such is expected.
The MAC entity needs not to monitor the PDCCH if it is not a complete PDCCH occasion (e.g. the Active Time starts or ends in the middle of a PDCCH occasion).

Figure 8:
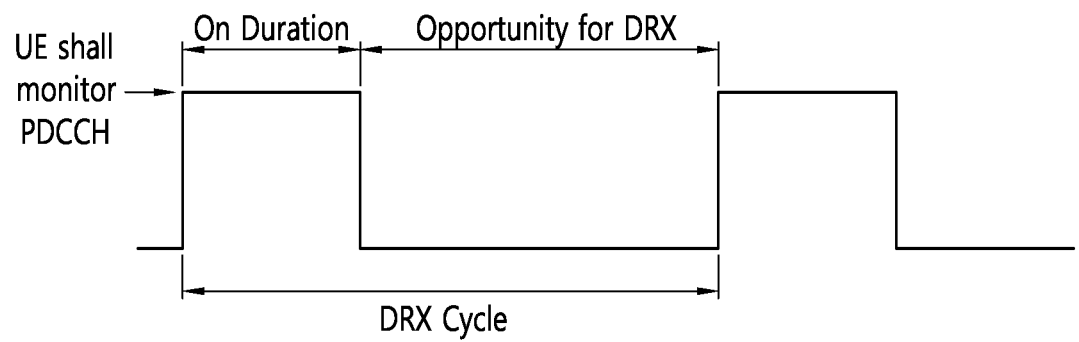
FIG. 8 shows an example of a DRX cycle according to an embodiment of the present disclosure.

FIG. 8 shows an example of a DRX cycle according to an embodiment of the present disclosure. The embodiment of FIG. 8 may be combined with various embodiments of the present disclosure.

Referring to FIG. 8, a UE uses DRX in RRC_IDLE and RRC_INACTIVE states to reduce power consumption. When DRX is configured, a UE performs a DRX operation according to DRX configuration information. A UE operating as a DRX repeatedly turns on and off a reception task.

For example, when DRX is configured, a UE attempts to receive a PDCCH, which is a downlink channel, only within a pre-configured time interval, and does not attempt to receive a PDCCH within the remaining time interval. The time period in which a UE should attempt a PDCCH reception is called an on-duration period, and the on-duration period is defined once per DRX cycle.

Meanwhile, in the Release 17 NR sidelink (SL) operation, SL discontinuous reception (DRX) operation is planned to be newly supported. In the embodiment(s) of the present disclosure, a method of operating a UE in an SL DRX on-duration period and an SL DRX off-duration period is proposed.

According to an embodiment of the present disclosure, when determining the validity of a received inter UE coordination message (e.g., whether to consider it in its own transmission resource selection), a UE may be configured to consider only an inter-device coordination message received from another UE located within a (pre-configured) (maximum, minimum, or average) communication range related to the service (s) of interest to the UE as valid. Here, for example, when the above rule is applied, the inter-device coordination message may include location information of a UE generating/transmitting it.

According to an embodiment of the present disclosure, when reporting/forwarding preferred SL DRX parameter/configuration information to a base station or a target UE (which communicates with itself), a UE may be configured to generate/signal this per packet delay budget (PDB) (and/or PQI and/or QoS parameter/requirement and/or service type). For example, the preferred SL DRX parameter/configuration information may include an on-duration size/location, a time-varying offset value related to the on-duration size/location, and an SL DRX cycle period.

According to an embodiment of the present disclosure, if a base station schedules/allocates transmission resources (part or all) not included in active time (related to SL DRX operation) (e.g., on-duration) interval (RX_ACWIN) (above the pre-configured threshold ratio/number of times) related to its target receiving UE to itself, a mode 1 transmitting UE may be configured to follow at least one of the following (some) rules. Here, for example, the rules of the present disclosure may be extended and applied to the mode 2 case.

For example, a UE may omit transmission of a packet (e.g., MAC PDU) through a resource not belonging to RX_ACWIN (or omit (all) transmission of a packet based on scheduled/allocated resources).

For example, when the rule is applied, If (some or all) (SL) MAC PDU-related (re)transmissions are omitted (more than a pre-configured threshold rate/count), The UE may report NACK (or ACK) information to the base station through PUCCH. Here, for example, it may be assumed that the priority of a PUCCH is that of (some or all) omitted MAC PDUs (more than a pre-configured threshold ratio/number of times).

For example, when a MAC PDU to be transmitted by a UE also targets reception of a vehicle UE (V-UE) (e.g., it can be interpreted as a UE with no limit on power consumption), a mode 1 transmitting UE may perform packet transmission even through a resource that does not belong to RX_ACWIN.

For example, if a packet to be transmitted by a UE targets only reception of a V-UE, the UE may select (candidate) resources that do not belong to SL DRX related active time (e.g., on-duration) interval for a Power saving UE (P-UE) (For example, it can be interpreted as a UE with limitations on power consumption) with a relatively high priority. Alternatively, for example, a UE may apply a pre-configured SL RSRP offset value (e.g., a positive real/integer value) to a (candidate) resource belonging to an SL DRX-related active time period.

Or, for example, if a packet to be transmitted by a UE here targets reception of only a P-UE (and/or targets reception of other UEs including a P-UE (e.g., V-UE)), a UE may preferentially select (candidate) resources (only) belonging to SL DRX related active time (e.g., on-duration) interval for the P-UE. Also, for example, when a packet to be transmitted by a UE targets reception of another UE (e.g., V-UE) including a P-UE (and/or only targets reception of a V-UE), among the (candidate) resources belonging to SL DRX related active time period for the P-UE, only resources of a pre-configured (maximum) threshold number/count may be allowed to be selected.

For example, the application of the rules described above may be interpreted that transmission on an SL DRX-related active time period for a P-UE is allowed (limitedly) only for packets with a higher priority (and/or packets targeted for reception of a pre-configured UE type (e.g., P-UE)) (and/or tight requirements (e.g. latency)) than a pre-configured threshold level. For example, the application of the rules described above may be interpreted that, if the congestion level of the interval is higher than a pre-configured threshold, transmission on the SL DRX related active time period for a P-UE is allowed (limitedly) only for packets with the priority higher than a pre-configured threshold level (and/or strict requirements) (and/or packets targeted for reception of pre-configured UE types).

According to an embodiment of the present disclosure, when a UE selects a transmission resource, the UE may select a resource on a previously configured SL DRX-related active time (common/default related to service/UE/QOS requirements (e.g. PDB, PQI)) (e.g., on-duration) interval (related to a target UE) with a relatively low priority, or the UE may apply a previously configured SL RSRP offset value (e.g., a positive real/integer value) to (candidate) resources belonging to the SL DRX-related active time period. Here, for example, the rule may be limitedly applied only when the congestion level in the active time period is higher than a pre-configured threshold (and/or if the UE transmits a packet with a lower priority (and/or loose requirement) than a pre-configured threshold level).

For example, when receiving changed/updated SL DRX parameter/configuration information from a receiving UE, or when a transmitting UE resets an SL DRX parameter/configuration information of the receiving UE, the transmitting UE may reselect (and/or reselect all transmission resources related to the receiving UE) only transmission resources that do not belong to a related active time period (e.g., on-duration).

For example, even if the UE is a UE performing an SL DRX operation, an SL SSB reception (and/or transmission) (and/or receiving (and/or transmitting) PSFCH (related to PSCCH/PSSCH transmitted by itself)) operation may be configured to be always performed, exceptionally.

For example, when an ON/OFF switching operation of an RF module is performed to receive an SL SSB outside an SL resource pool or etc., the resulting interruption of SL communication may be configured so as not to exceed a pre-configured (maximum) critical time/number/rate.

For example, when a UE transmits a packet targeting a P-UE, information indicating the number of transmission resources scheduled/to be used and/or that it is the last resource among related to transmission resources may be signaled on SCI scheduling transmission resources related to the packet.

For example, in the present disclosure, the term (interference) may be extended and interpreted as a communication interruption (time) domain caused by RF retuning (and/or numerology change) related to BWP switching (and/or communication interruption (time) domain caused by cell activation/deactivation (switching)) not only as communication interruption (time) domain caused by On/Off (switching) of RF module related to DRX operation. In addition, for example, the proposed rules/methods in this disclosure may also be extended to a situation in which interference occurs on another cell (group) (and/or carrier) due to the occurrence of the above-described cause on a specific cell (group) (and/or carrier), not only to an interference situation caused by (some) causes described above on the same cell (group) (and/or carrier).

In the embodiment(s) of the present disclosure, an SL DRX operation and NR resource allocation mode 2 operation of a UE based on an SL DRX inactivity timer are proposed. In addition, in the present disclosure, an operation of starting an SL DRX inactivity timer when a receiving UE receives a new transport block (TB) (PSCCH or PSSCH) may be assumed in the prior art.

For example, in NR SL mode 2 operation, a transmitting UE may instruct a receiving UE of a plurality of resources related to a new TB or retransmission TB through PSCCH (SCI) to the receiving UE, and may also perform SL transmission using the indicated plurality of resources.

Figure 9:
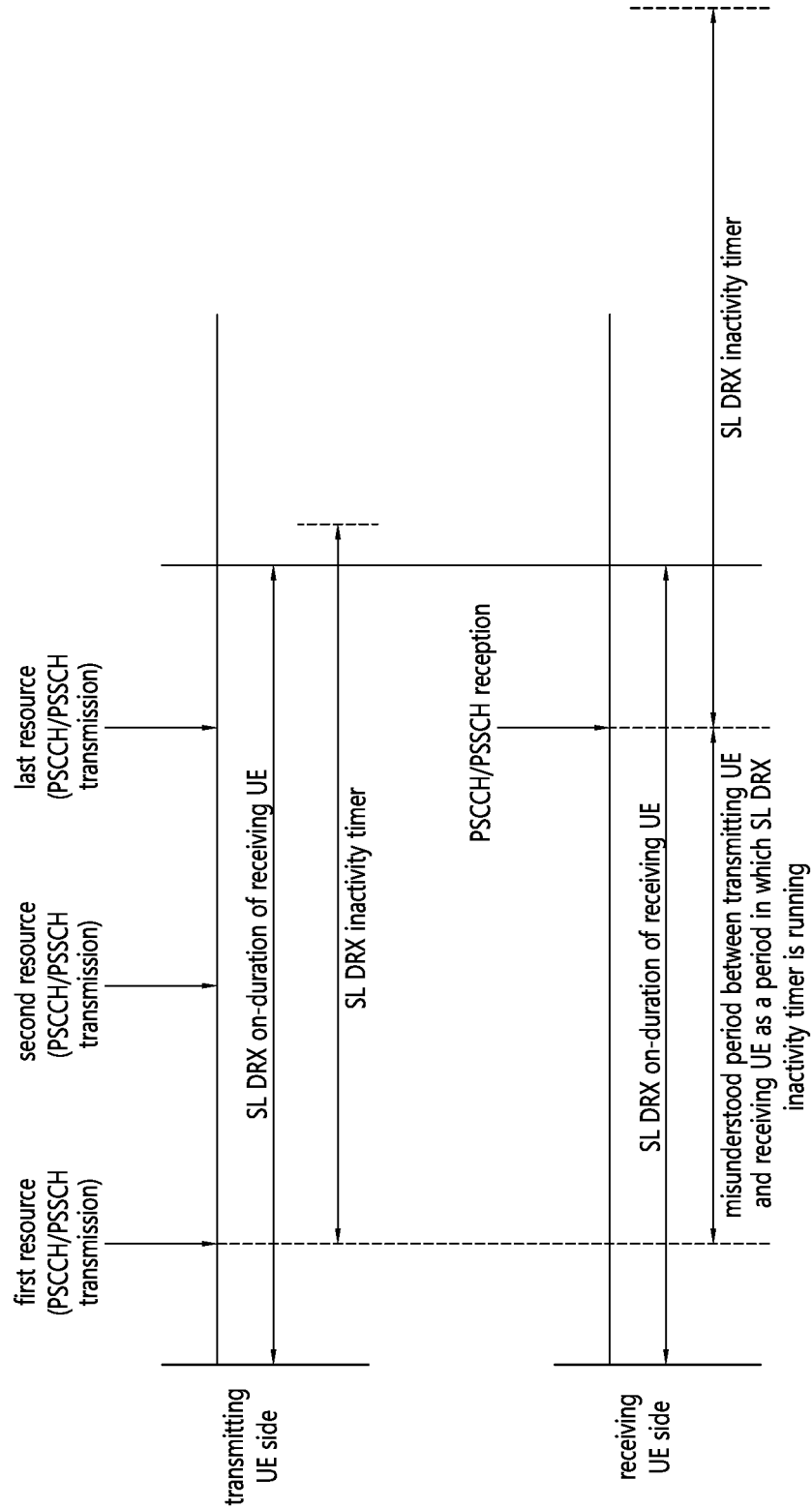
FIG. 9 shows misunderstanding between a transmitting UE and a receiving UE for an interval in which an SL DRX inactivity timer is operating, according to an embodiment of the present disclosure.

FIG. 9 shows misunderstanding between a transmitting UE and a receiving UE for an interval in which an SL DRX inactivity timer is operating, according to an embodiment of the present disclosure. The embodiment of FIG. 9 may be combined with various embodiments of the present disclosure.

Referring to FIG. 9, when a transmitting UE performs transmission on a new TB (PSCCH/PSSCH) using a first resource, a second resource, and a third resource, the transmitting UE may determine that a receiving UE starts an SL DRX inactivity timer at the time of the first resource. On the other hand, for example, the receiving UE cannot receive the first transmission and the second transmission transmitted by the transmitting UE, and may successfully receive only the last transmission. In this case, the receiving UE may start the SL DRX inactivity timer at the resource domain time for the last transmission (or the time of receiving the last transmission or the time of transmitting a PSFCH for the reception of the last transmission). In this case, for example, as shown in FIG. 9, a problem of misalignment with respect to the start time of the SL DRX inactivity timer between the transmitting UE and the receiving UE may occur. For example, in this case, an error may occur in the SL DRX operation of the UE. For example, a problem may occur in that the transmitting UE determines that the receiving UE is operating in a sleep mode (because it determines that the SL DRX inactivity timer has expired), while the receiving UE operates in an active period (because the SL DRX inactivity timer expires later than the time the transmitting UE thinks).

In the present disclosure, a method for solving the misalignment of the start time of an SL DRX inactivity timer between a transmitting UE and a receiving UE mentioned in the above problem is proposed.

Figure 10:
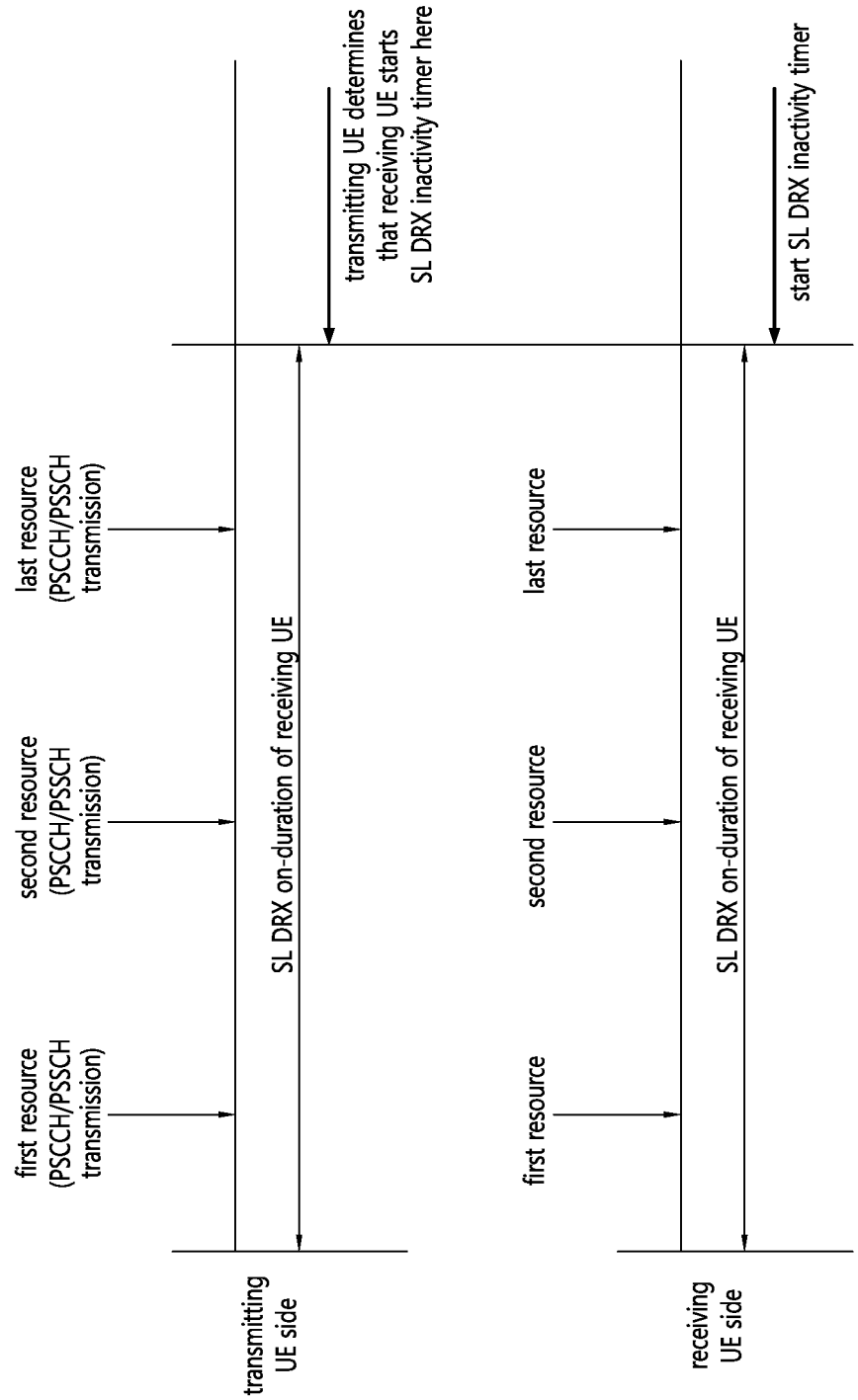
FIG. 10 shows an example in which an SL DRX inactivity timer operates according to an embodiment of the present disclosure.

FIG. 10 shows an example in which an SL DRX inactivity timer operates according to an embodiment of the present disclosure. The embodiment of FIG. 10 may be combined with various embodiments of the present disclosure.

Referring to FIG. 10, a method in which a receiving UE starts an SL DRX inactivity timer at the expiration of its own SL DRX on-duration timer is proposed. For example, a method of a transmitting UE as well, for determining/ considering/assuming that a receiving UE started an SL DRX inactivity timer at the expiration time point of an SL DRX on-duration timer of the receiving UE is proposed.

Or, for example, a method of starting an SL DRX inactivity timer when a receiving UE starts its own SL DRX on-duration timer is proposed. For example, a method of a transmitting UE as well, for determining/considering/assuming that a receiving UE started an SL DRX inactivity timer at the start time point of an SL DRX on-duration timer of the receiving UE is proposed. For example, the timer start time point may be replaced by a predetermined time after the timer start time point and a predetermined time before the timer expiration time point. Also, the predetermined time may be a pre-configured value and/or a value indicated by an upper layer/physical layer signal.

Figure 11:
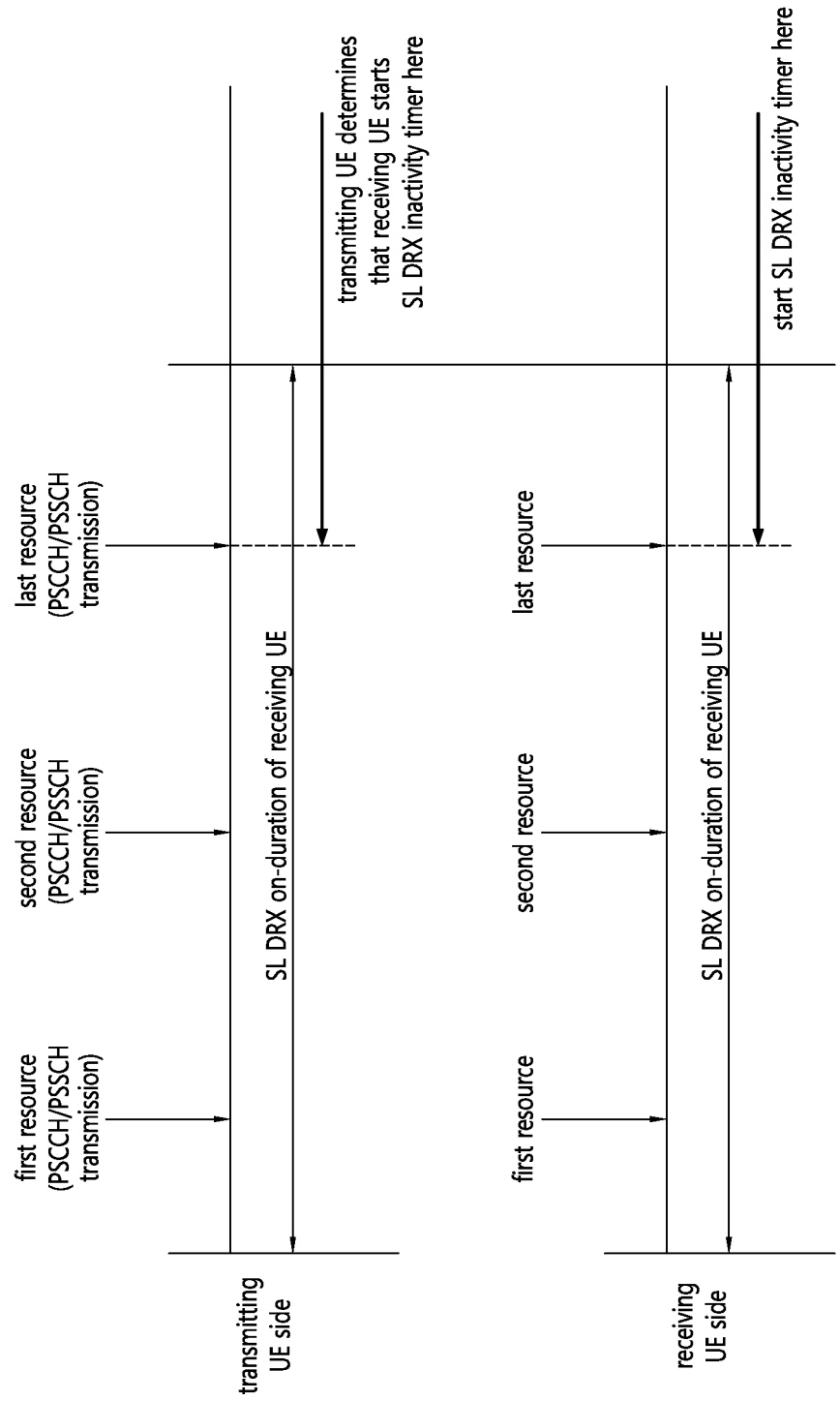
FIG. 11 shows an example in which an SL DRX inactivity timer operates according to an embodiment of the present disclosure.

FIG. 11 shows an example in which an SL DRX inactivity timer operates according to an embodiment of the present disclosure. The embodiment of FIG. 11 may be combined with various embodiments of the present disclosure.

Referring to FIG. 11, an embodiment capable of resolving the misalignment of the start time of an SL DRX inactivity timer between a transmitting UE and a receiving UE is presented. That is, for example, a method in which a receiving UE starts an SL DRX inactivity timer at the time of the last resource region reserved by a transmitting UE through SCI (or the time of reception of the last transmission or when a PSFCH is transmitted for reception of the last transmission), within its own SL DRX on-duration period is proposed. For example, a method of a transmitting UE as well, for determining/considering/assuming that a receiving UE has started an SL DRX inactivity timer at the last resource region time reserved by the transmitting UE through SCI (or, the last transmission time), within an SL DRX on-duration period of the transmitting UE and the receiving UE is proposed.

Or, for example, a method in which a receiving UE starts an SL DRX inactivity timer at the first resource region time reserved by a transmitting UE through SCI (or the time of reception of the first transmission or the time of transmitting a PSFCH for reception of the first transmission), within its SL DRX on-duration period is proposed. For example, a method of a transmitting UE as well, for determining/ considering/assuming that a receiving UE has started an SL DRX inactivity timer in the first resource domain time reserved by the transmitting UE through SCI (or, the first transmission time), within an SL DRX on-duration period of the receiving UE is proposed.

Figure 12:
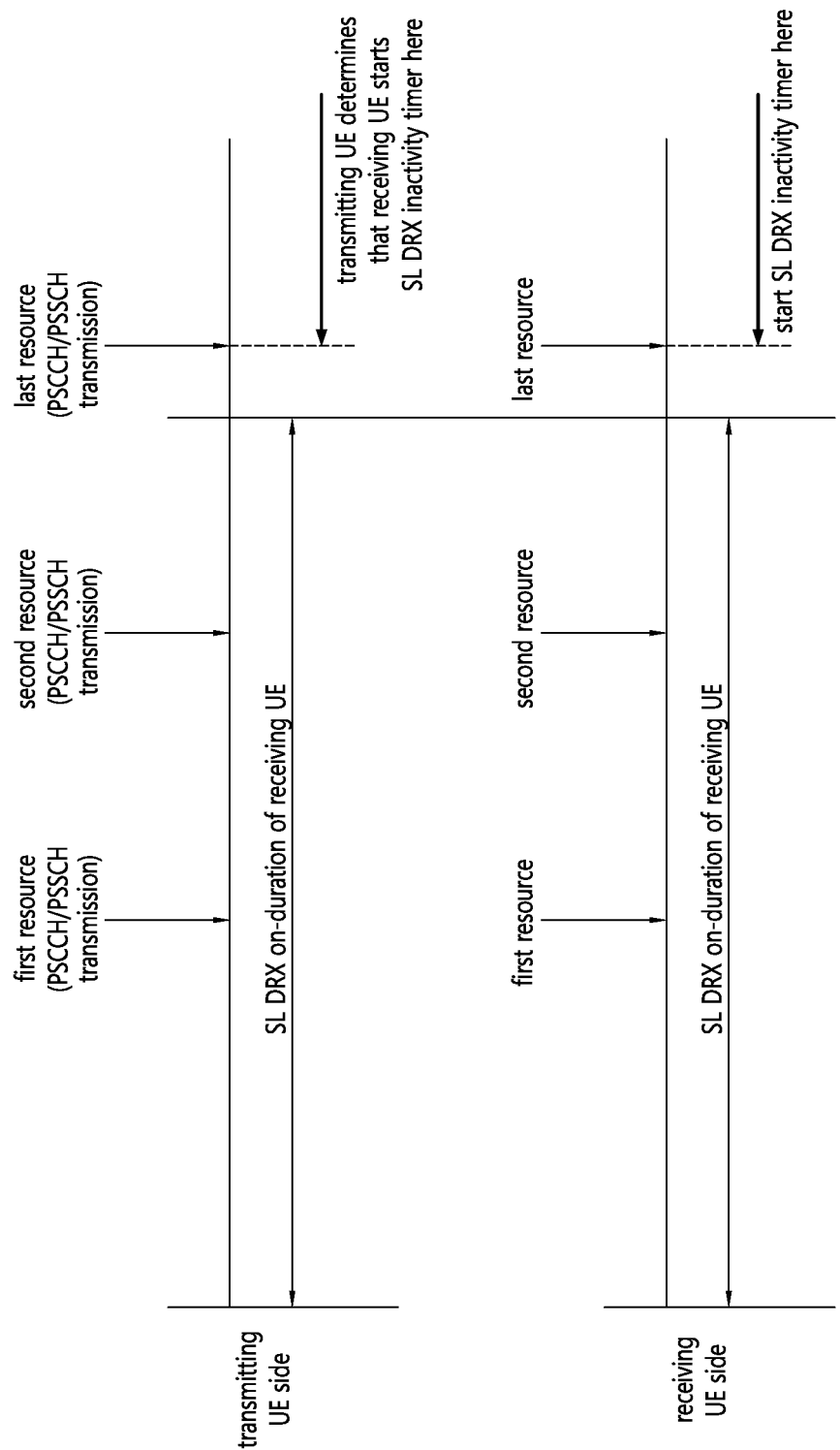
FIG. 12 shows an example in which an SL DRX inactivity timer operates according to an embodiment of the present disclosure.

FIG. 12 shows an example in which an SL DRX inactivity timer operates according to an embodiment of the present disclosure. The embodiment of FIG. 12 may be combined with various embodiments of the present disclosure.

Referring to FIG. 12, an embodiment capable of resolving the misalignment of the start time of an SL DRX inactivity timer between a transmitting UE and a receiving UE is presented. For example, FIG. 12 shows an embodiment for a case where the indicated last transmission resource is out of an SL DRX on-duration of a receiving UE, when a transmitting UE indicates the resources related to a new TB or a retransmission TB through SCI and transmit it to a receiving UE.

Referring to FIG. 12, if the last resource region time reserved by a transmitting UE through SCI (or the time of reception of the last transmission or when a PSFCH was transmitted for reception of the last transmission) is out of an SL DRX on-duration period of a receiving UE, when an SL DRX on-duration expires, the receiving UE transitions to the sleep mode and may operate in the sleep mode until the last transmission resource region time indicated by the transmitting UE in the SCI. Also, for example, a method in which a receiving UE transitions to an active mode and starts an SL DRX inactivity timer, when it reaches the last transmission resource region time which a transmitting UE indicated in the SCI is proposed. For example, a method of a transmitting UE as well, for determining/considering/assuming that a receiving UE has started an SL DRX inactivity timer at the last resource domain time reserved by the transmitting UE through SCI (or, the last transmission time) is proposed.

Or, for example, if the last resource region time reserved by a transmitting UE through SCI (or the time of reception of the last transmission or when a PSFCH was transmitted for reception of the last transmission) is out of an SL DRX on-duration period of a receiving UE, the receiving UE may start an SL DRX inactivity timer when the SL DRX on-duration expires, and the transmitting UE may also determine/consider/assume that the receiving UE has started an SL DRX inactivity timer at this time point.

Figure 13:
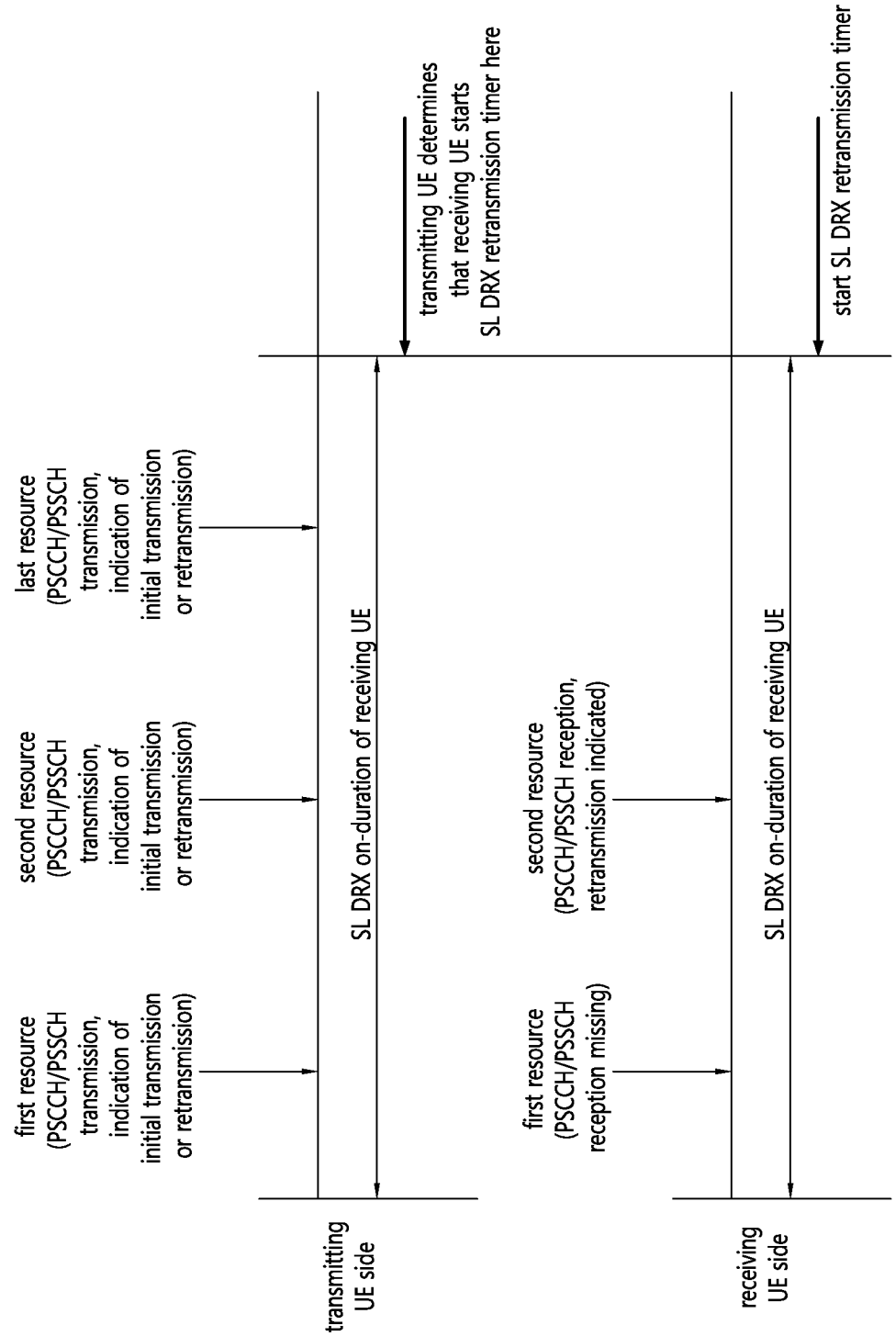
FIG. 13 shows an example of an SL DRX retransmission timer operating according to an embodiment of the present disclosure.

FIG. 13 shows an example of an SL DRX retransmission timer operating according to an embodiment of the present disclosure. The embodiment of FIG. 13 may be combined with various embodiments of the present disclosure.

Referring to FIG. 13, a method in which a transmitting UE indicates whether the current transmission (transmission performed based on transmission resources indicated by SCI) of the transmitting UE is an initial transmission or a retransmission to an SCI and transmits the information to a receiving UE is proposed. For example, when the receiving UE checks the SCI transmitted by the transmitting UE and receives an indication that the current transmission is retransmission, the receiving UE may start an SL DRX retransmission timer or an SL DRX HARQ RTT timer instead of an SL DRX inactivity timer.

Also, for example, the receiving UE may need to determine when to start an SL DRX Inactivity Timer or an SL DRX Retransmission Timer (or an SL DRX HARQ RTT Timer). For example, in FIG. 13, a method in which the receiving UE considers the time point at which the SL DRX on-duration expires as a reference time and starts an SL DRX inactivity timer or an SL DRX retransmission timer (or SL DRX HARQ RTT timer) is proposed. For example, when the receiving UE successfully receives a PSCCH/PSSCH transmitted by the transmitting UE and when the transmitting UE indicates to the receiving UE that the current transmission is SL initial transmission in SCI, the receiving UE may start an SL DRX inactivity timer at the expiration time point of the SL DRX on-duration.

For example, the SL DRX inactivity timer may be a timer operated by a receiving UE to receive SL initial transmission data transmitted by a transmitting UE. For example, the SL DRX retransmission timer may be a timer operated by a receiving UE to receive SL retransmission data retransmitted by a transmitting UE. For example, a receiving UE may determine/consider/assume that a transmitting UE will transmit an SL retransmission packet after an SL DRX HARQ RTT timer expires, accordingly, while the SL DRX HARQ RTT timer is running, the receiving UE may operate in sleep mode. In addition, the receiving UE may transition to an active mode after expiration of the SL DRX HARQ RTT timer, start an SL DRX retransmission timer, and receive SL retransmission data transmitted by the transmitting UE.

Referring to FIG. 13, an embodiment of a case in which a receiving UE successfully receives a PSCCH/PSSCH transmitted by a transmitting UE, and the transmitting UE indicates to the receiving UE that the current transmission is SL retransmission through SCI is represented. Since the current transmission is SL retransmission, the receiving UE may start an SL DRX retransmission timer (or SL DRX RTT timer) at the expiration time point of SL DRX on-duration. In addition, the transmitting UE may perform an SL DRX operation by determining/considering/assuming that the receiving UE has started an SL DRX retransmission timer (or SL DRX RTT timer) at the expiration time point of the SL DRX on-duration. That is, for example, the transmitting UE may synchronize the SL DRX timer start time and expiration time between the transmitting UE and the receiving UE, and perform an SL DRX operation based on this.

According to an embodiment of the present disclosure, a resource reservation method of a transmitting UE which allows all transmissions, transmitted based on a plurality of resources reserved by the transmitting UE through SCI for the same or different transmission, to be transferred to a receiving UE in the operation period of the SL DRX on-duration timer or the SL DRX inactivity timer of the receiving UE, or the operation period of the SL DRX timer is proposed. For example, the same transmission may mean transmissions of multiple MAC PDUs constituting the same TB or repeated transmission of one MAC PDU. For example, the different transmissions may include multiple MAC PDU transmissions for different TB s. For example, the SL DRX timer of the receiving UE may include a timer allowing the receiving UE to operate in an active time (e.g., SL DRX retransmission timer).

Figure 14:
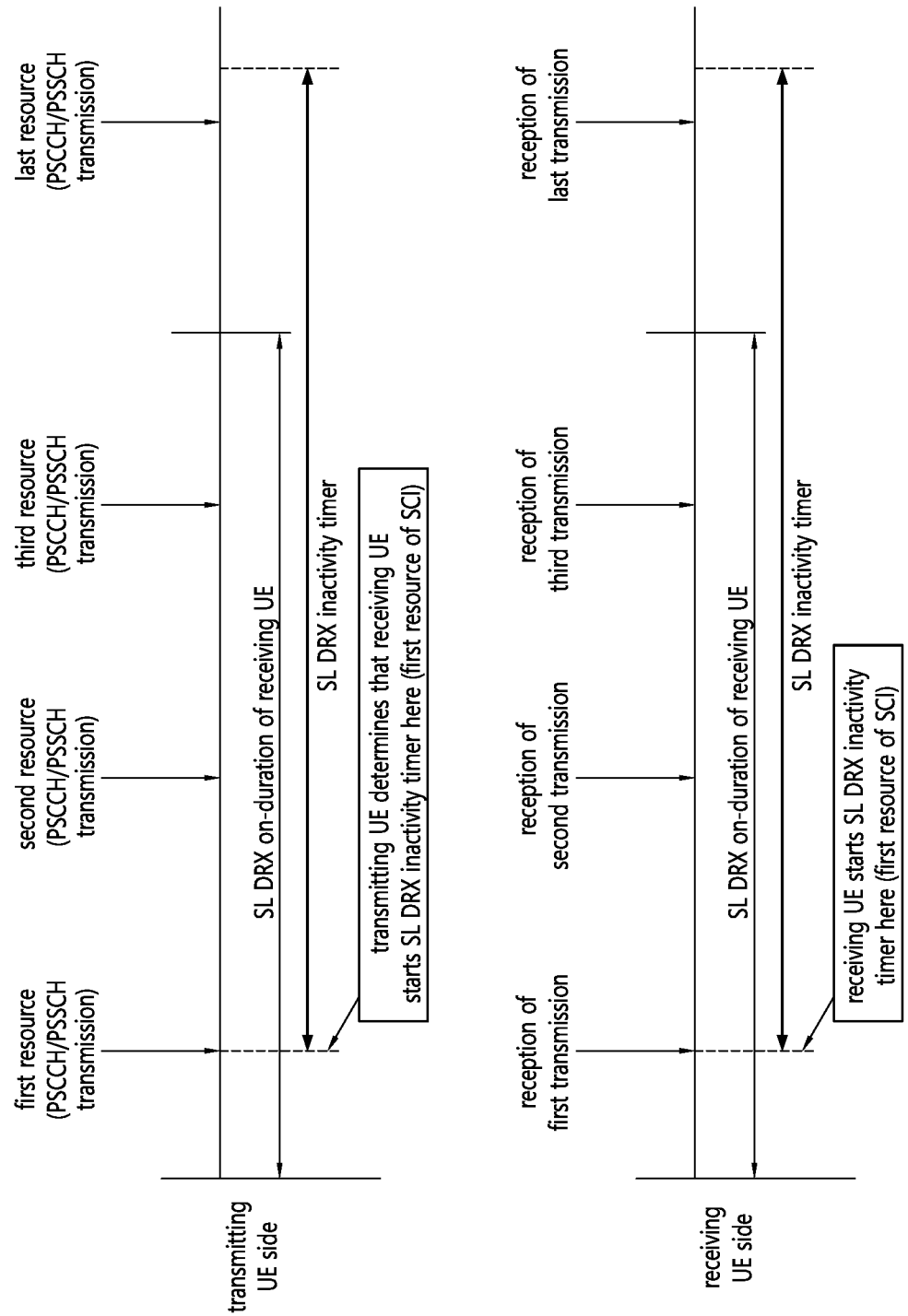
FIG. 14 shows a resource selection method considering the operating time of an SL DRX inactivity timer according to an embodiment of the present disclosure.

FIG. 14 shows a resource selection method considering the operating time of an SL DRX inactivity timer according to an embodiment of the present disclosure. The embodiment of FIG. 14 may be combined with various embodiments of the present disclosure.

Referring to FIG. 14, when a transmitting UE reserves transmission resources, for example, when the transmitting UE selects 5 transmission resources since 5 transmission resources are required for transmission of a plurality of MAC PDUs constituting the same TB, when selecting a first resource, the transmitting UE may simultaneously select 5 transmission resources. Also, for example, the 5 transmission resources may be reserved through 5 SCIs as follows. For example, up to three transmission resources may be reserved through one SCI, and five transmission resources may be reserved in a chain form as follows.

Reserved resources indicated in the 1st SCI: 1st resource for 1st transmission, 2nd resource for 2nd transmission, 3rd resource for 3rd transmission.

Reserved resources indicated in the 2nd SCI: 2nd resource for 2nd transmission, 3rd resource for 3rd transmission, 4th resource for 4th transmission.

Reserved resources indicated in the 3rd SCI: 3rd resource for 3rd transmission, 4th resource for 4th transmission, and the last (5th) resource for the last transmission.

Reserved resources indicated in the 4th SCI: 4th resource for 4th transmission, the last (5th) resource for the last transmission.

Reserved resource indicated in the 5th SCI: the last (5th) resource for the last transmission.

In addition, for example, when a receiving UE receives a PSSCH transmitted based on a first resource reserved by a transmitting UE through first SCI, the receiving UE may start an SL DRX inactivity timer or an SL DRX timer and perform monitoring for receiving a PSSCH or PSCCH additionally transmitted by the transmitting UE. In addition, the transmitting UE may know the duration of the SL DRX inactivity timer or the SL DRX timer started by the receiving UE. For example, the transmitting UE may know the duration of the SL DRX inactivity timer or the SL DRX timer started by the receiving UE through pre-negotiation. Accordingly, the transmitting UE may select and reserve resources such that transmissions through the transmission resources reserved for its own transmission is performed within the SL DRX inactivity timer or SL DRX timer interval of the receiving UE. That is, when a transmitting UE performs the same transmission or different transmission through 3+N transmissions, the transmitting UE may select resources for N transmissions within a time interval before the SL DRX inactivity timer or the SL DRX timer expires, which is started due to the first transmission.

Referring to FIG. 14, an embodiment in which a transmitting UE selects resources so that transmissions through the reserved transmission resources are performed within the operation period of an SL DRX timer of a receiving UE, and the transmitting UE reserves the selected resources through SCI and transmits PSSCH through the reserved resources is presented. For example, if the method proposed in this disclosure is not considered, a problem may occur in that a transmitting UE must perform remaining SL transmission (remaining transmissions from reserved resources) in a time interval outside the SL DRX timer of the receiving UE (or time interval after expiry).

Figure 15:
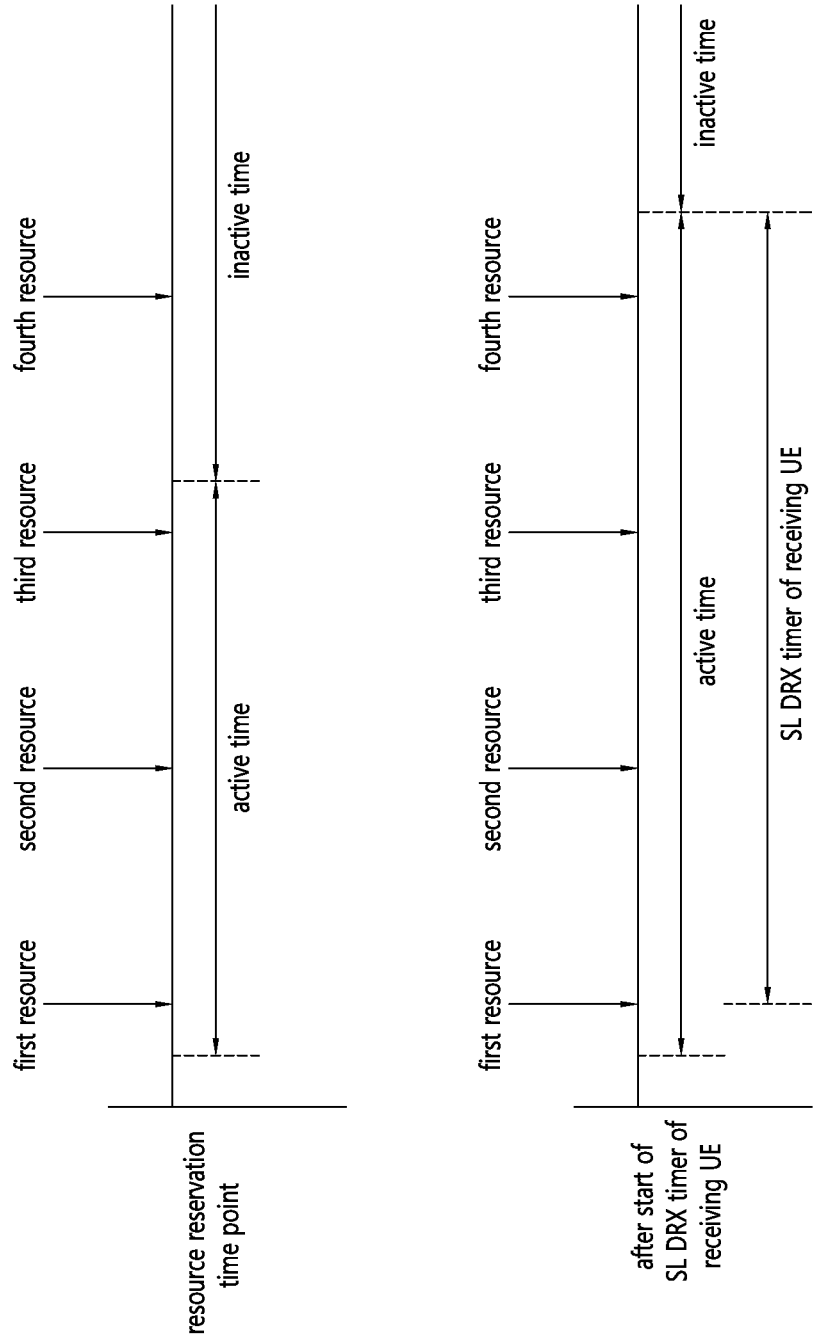
FIG. 15 shows resources selected by a transmitting UE according to an embodiment of the present disclosure.

FIG. 15 shows resources selected by a transmitting UE according to an embodiment of the present disclosure. The embodiment of FIG. 15 may be combined with various embodiments of the present disclosure.

Referring to FIG. 15, first to fourth resources reserved by a transmitting UE through resource selection are shown. For example, the first resource to the third resource may be included in active time of a receiving UE at a time point of resource reservation. That is, the transmitting UE may select the first resource to the third resource within an active time of the receiving UE at a time point of the resource reservation. For example, the active time of the receiving UE at a time point of the resource reservation may be time in which an SL DRX on-duration timer, SL DRX inactivity timer, etc. of the receiving UE are running on the basis of the time point of the resource reservation. And, the fourth resource may be included outside the active time of the receiving UE at the time point of the resource reservation, that is, the inactive time of the receiving UE at the time point of the resource reservation.

For example, a receiving UE may receive SL data through PSCCH/PSSCH based on the first resource to the third resource. And, the receiving UE may start an (additional) SL DRX timer (e.g., SL DRX inactivity timer, SL DRX retransmission timer, etc.) based on the received SL data. Due to the SL DRX timer started based on the received SL data, an active time after starting the SL DRX timer of the receiving UE may be extended. Here, for example, the fourth resource may be included in active time after starting the SL DRX timer of the receiving UE. That is, the transmitting UE may select the fourth resource in an inactive time of the receiving UE at the time point of the resource reservation, bearing in mind that the SL DRX timer is started due to the SL data.

According to an embodiment of the present disclosure, a method for enabling an SL transmission transmitted by a transmitting UE to be successfully received by a receiving UE in SL DRX operation is proposed as follows. For example, in FIG. 16 below, an embodiment of assuming/premising/setting/configuring that an SL DRX inactivity timer is started when a receiving UE receives the first transmission transmitted by a transmitting UE is represented. For example, the first transmission may mean transmission using a first resource among (maximum) three resources reserved by the transmitting UE through SCI.

Figure 16:
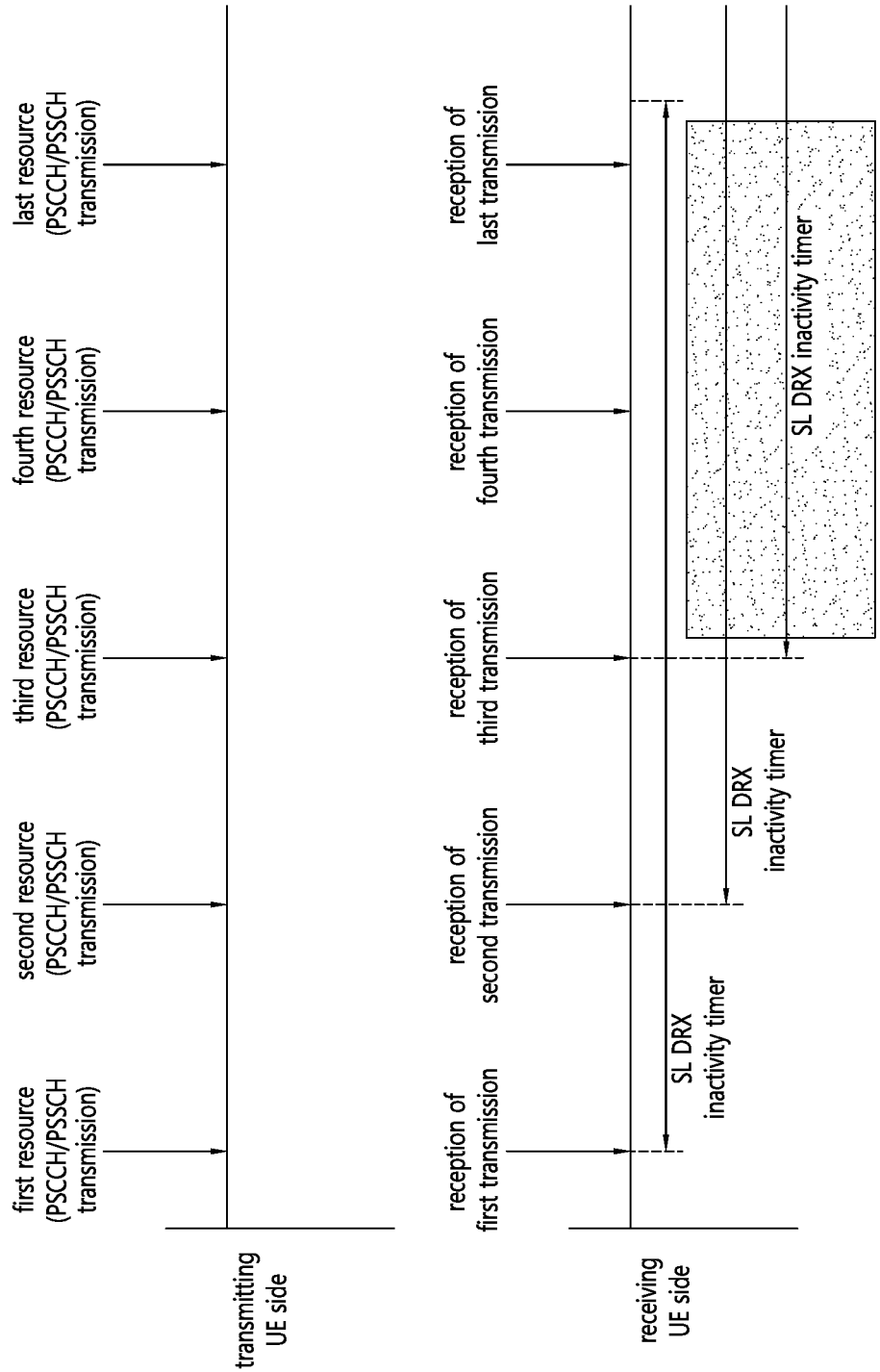
FIG. 16 shows a resource selection method considering the operating time of an SL DRX inactivity timer according to an embodiment of the present disclosure.

FIG. 16 shows a resource selection method considering the operating time of an SL DRX inactivity timer according to an embodiment of the present disclosure. The embodiment of FIG. 16 may be combined with various embodiments of the present disclosure.

Referring to FIG. 16, when a transmitting UE selects 5 resources for one SL TB transmission and reserves the 5 selected resources through SCI, the transmitting UE may perform SL TB transmission to a receiving UE using the five reserved resources. For example, the transmitting UE may reserve the 5 selected resources through SCI as follows and transmit PSCCH (SCI)/PSSCH during each transmission.

Reserved resources indicated in 1st SCI (SCI linked to a 1st PSSCH transmission, 1st transmission in FIG. 16): 1st resource for 1st transmission, 2nd resource for 2nd transmission, 3rd resource for 3rd transmission.

Reserved resources indicated in 2nd SCI (SCI linked to a 2nd PSSCH transmission, 2nd transmission in FIG. 16): 2nd resource for 2nd transmission, 3rd resource for 3rd transmission, 4th resource for 4th transmission.

Reserved resources indicated in 3rd SCI (SCI linked to a 3rd PSSCH transmission, 3rd transmission in FIG. 16): 3rd resource for 3rd transmission, 4th resource for 4th transmission, the last (5th) resource for the last transmission.

Reserved resources indicated in 4th SCI (SCI linked to a 4th PSSCH transmission, 4th transmission in FIG. 16): 4th resource for 4th transmission, the last (5th) resource for the last transmission.

Reserved resource indicated in 5th SCI (SCI linked to a 5th PSSCH transmission, the last transmission in FIG. 16): the last (5th) resource for the last transmission.

For example, the receiving UE may start an SL DRX inactivity timer when receiving a first transmission transmitted by the transmitting UE. If the receiving UE misses reception of the first transmission and receives a second transmission for the first time, the receiving UE may determine the second transmission as the first transmission and start an SL DRX inactivity timer. If the receiving UE misses reception of the first transmission and the second transmission and receives a third transmission for the first time, the receiving UE may determine the third transmission as the first transmission and start an SL DRX inactivity timer.

That is, for example, since up to three transmission resources are reserved through SCI and the reserved transmission resources are indicated through the SCI, when a receiving UE receives SCI (PSCCH) for a first transmission transmitted by the transmitting UE, it may know that the transmitting UE will transmit up to the third transmission resource. That is, the receiving UE may decode SCI and may know in which time/frequency domain the transmitting UE will transmit PSSCH up to three transmissions.

Subsequently, when the receiving UE receives SCI (PSCCH) for a second transmission transmitted by the transmitting UE, it may know that the transmitting UE will transmit up to the fourth transmission resource. When the receiving UE receives SCI (PSCCH) for a third transmission transmitted by the transmitting UE, it may know that the transmitting UE will transmit up to the fifth transmission resource. That is, for example, when the receiving UE misses reception of the first transmission among the three transmissions indicated by the transmitting UE in one SCI, the receiving UE may need to receive SCI related to the second transmission in order to receive fourth and fifth transmissions, if the receiving UE misses reception of the first transmission and the second transmission, the receiving UE may need to receive SCI related to the third transmission in order to receive the fourth and fifth transmissions, if the receiving UE misses reception of the first transmission, the second transmission, and the third transmission, in order to receive the 4th and 5th transmissions, the receiving UE may need to receive a new SCI related to the 4th transmission (because only up to 3 resources can be reserved in one SCI).

Therefore, for example, in the present disclosure, in order for a receiving UE to successfully receive a PSSCH transmitted by a transmitting UE using a resource right next to the resources reserved through an initial SCI (resources for a fourth transmission and the last transmission in FIG. 16), a method in which the transmitting UE selects a resource for the fourth transmission and/or the fifth transmission (that is, SL transmission transmitted using the resource right next to, the first SCI or the last transmission resource indicated in the current SCI) and transmits the resource to the receiving UE, in the operation region of the overlapping SL DRX inactivity timer, assuming that the receiving UE receives each PSSCH (first transmission, second transmission, and third transmission) transmitted by the transmitting UE using three resources indicated by the SCI and starts the SL DRX inactivity timer, is proposed. For example, the operation region of the overlapping SL DRX inactivity timer may be the marked portion of FIG. 16, that is, in FIG. 16, it may be a time domain from the time point when the third transmission is received to the time point when the timer started at the time point when the first transmission is received ends. That is, for example, the transmitting UE may select resources for the fourth transmission and/or the fifth transmission within a (time) region in which three SL DRX inactivity timers (or SL DRX on-duration timer or SL DRX retransmit timer) started by each of the three transmissions (all) overlap.

The SL DRX timer mentioned in this disclosure may be used for the following purposes.

SL DRX on-duration timer: it may be a timer related to a period that must exist as an active time from the start of an SL DRX cycle in order for a receiving UE to monitor a PSCCH or PSSCH of a transmitting UE when the SL DRX cycle is configured. For example, when an SL DRX on-duration timer expires, the UE may transition to SL sleep mode.

SL DRX inactivity timer: it may be a timer started when a receiving UE receives a PSCCH/PSSCH from a transmitting UE. For example, the receiving UE may operate in an SL active state during the timer operation period and monitor a PSCCH/PSSCH transmitted by the transmitting UE.

SL DRX HARQ RTT timer: it may be a timer started when a receiving UE receives a PSSCH transmitted by a transmitting UE and transmits SL HARQ feedback (e.g., HARQ NACK). For example, the receiving UE may determine that the transmitting UE will not transmit an SL retransmission packet until the timer expires and operate in the SL sleep mode until the timer expires. For example, when the SL DRX HARQ RTT timer expires, the receiving UE may transition to an SL active state and monitor/receive an SL retransmission packet transmitted by the transmitting UE.

SL DRX Retransmission Timer: it may be a timer that allows a receiving UE to transition to the SL active state when an SL DRX HARQ RTT timer expires to monitor/receive an SL retransmission packet transmitted by a transmitting UE. For example, the receiving UE may monitor/receive an SL retransmission packet transmitted by the transmitting UE while the timer is running.

The on-duration term mentioned in the proposal of the present disclosure may be extended and interpreted as an active time period. For example, the active time period may mean a period operating in a wake up state (RF module is "On") to receive/transmit a radio signal. In addition, for example, whether or not to apply (some) proposed methods/rules of the present disclosure and/or related parameters (e.g., threshold values) may be configured specifically (or differently, or independently) according to a resource pool, the congestion level, the service priority (and/or type), the requirements (e.g., delay, reliability), a traffic type (e.g., (a) periodic generation), SL transmission resource allocation mode (mode 1, mode 2), etc.

For example, the name of the SL DRX inactivity timer is exemplary, and a similar name may be used to refer to a timer related to DRX inactivity in SL. For example, the name of the SL DRX HARQ RTT timer is exemplary, and a similar name may be used to refer to a timer related to HARQ RTT in SL. For example, the name of the SL DRX retransmission timer is exemplary, and a similar name may be used for a timer related to retransmission in SL.

According to an embodiment of the present disclosure, when the misalignment of the start time of an SL DRX inactivity timer between a transmitting UE and a receiving UE occurs, a method to solve this problem has been proposed. Through the proposed method, an effect of matching the synchronization of SL DRX operations between a transmitting UE and a receiving UE (synchronization related to the start time of the sleep mode and the transition time to the active time) may occur.

According to an embodiment of the present disclosure, by selecting resources within a current SL DRX inactive time, which can be extended by reception of SL packets, an effect may occur in which misunderstanding of the active time due to packet loss of the receiving UE between a receiving UE and a transmitting UE does not occur, and an effect that a UE performing an SL DRX operation can perform more efficient SL communication may occur.

Figure 17:
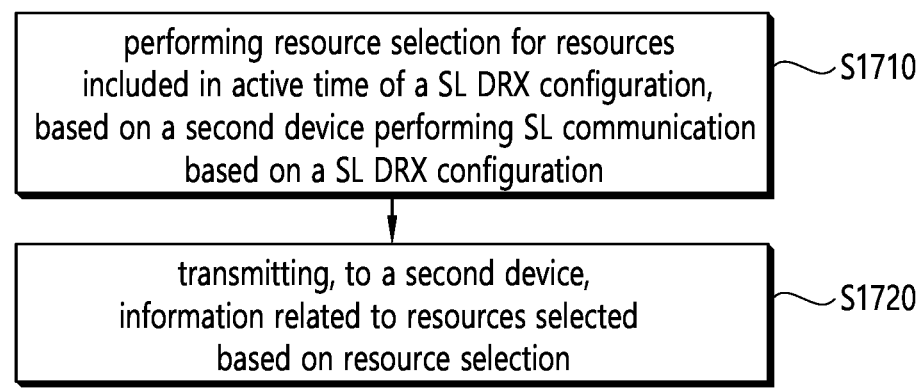
FIG. 17 shows a procedure in which a first device performs wireless communication according to an embodiment of the present disclosure.

FIG. 17 shows a procedure in which a first device performs wireless communication according to an embodiment of the present disclosure. The embodiment of FIG. 17 may be combined with various embodiments of the present disclosure.

Referring to FIG. 17, in step S1710, a first device may perform resource selection for resources included in active time of a sidelink (SL) discontinuous reception (DRX) configuration, based on a second device performing SL communication based on the SL DRX configuration. In step S1720, the first device may transmit, to the second device, information related to resources selected based on the resource selection. For example, the active time may include time in which a first timer related to on-duration of the SL DRX configuration or a second timer of the SL DRX configuration is running. For example, the first timer may be a SL DRX on-duration timer. For example, the second timer may be a timer that causes the second device to operate in an active mode. For example, the timer that causes to operate in an active mode may include an SL DRX inactivity timer, an SL DRX retransmission timer, and the like.

For example, the resource selection may be performed at a first time point, the resources selected based on the resource selection may include a first SL resource and a second SL resource, the first SL resource may be included within time duration in which the first timer or the second timer is running, the second SL resource may be included within time duration in which a third timer of the SL DRX configuration is running, the third timer may be started at a second time point after the first time point, and the active time may include time in which the third timer is running.

For example, additionally, the first device may transmit, to the second device, SL data based on the first SL resource, wherein the third timer may be started based on the SL data transmitted based on the first SL resource.

For example, the second SL resource may be included within time duration in which the first timer and the second timer are not running.

For example, additionally, the first device may transmit, to the second device, first sidelink control information (SCI) for scheduling of a physical sidelink shared channel (PSSCH) through a physical sidelink control channel (PSCCH), based on a resource included in the resources selected based on the resource selection; and transmit, to the second device, second SCI and SL data through the PSSCH, based on the resource included in the resources selected based on the resource selection.

For example, the first SCI may include information related to the resources selected based on the resource selection.

For example, the resources selected based on the resource selection may be three adjacent resources.

For example, additionally, the first device may receive, from the second device, information related to the first timer and the second timer.

For example, the resources selected based on the resource selection may include three or more SL resources, and first three resources of the three or more SL resources may be included within time duration in which the first timer is running.

For example, the resources selected based on the resource selection may include a first SL resource, a second SL resource, and a third SL resource, information related to the resources selected based on the resource selection may be transmitted through SCI, the SCI may include information related to the first SL resource and the second SL resource, the second SL resource may be a last resource among resources to which related information is transmitted through the SCI, the third SL resource may be a resource right next to the second SL resource among the resources selected based on the resource selection, a third timer of the SL DRX configuration may be started at a time point in which the second device receives SL data based on the first SL resource or the second SL resource, the first SL resource and the second SL resource may be included within time duration in which the first timer or the second timer are running, and the third SL resource may be included within time duration in which the third timer is running. For example, the third timer may be a timer that causes the second device to operate in an active mode. For example, the timer that causes to operate in an active mode may include an SL DRX inactivity timer, an SL DRX retransmission timer, and the like.

For example, the third timer may be started at a time point in which the second device receives the SL data based on the second SL resource.

For example, the SCI may include information related to three resources.

For example, the first SL resource may be a first resource among the resources selected based on the resource selection.

The above-described embodiment may be applied to various devices described below. For example, a processor 102 of a first device 100 may perform resource selection for resources included in active time of a sidelink (SL) discontinuous reception (DRX) configuration, based on a second device 200 performing SL communication based on the SL DRX configuration. And, the processor 102 of the first device 100 may control a transceiver 106 to transmit, to the second device 200, information related to resources selected based on the resource selection. For example, the active time may include time in which a first timer related to on-duration of the SL DRX configuration or a second timer of the SL DRX configuration is running.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: perform resource selection for resources included in active time of a sidelink (SL) discontinuous reception (DRX) configuration, based on a second device performing SL communication based on the SL DRX configuration; and transmit, to the second device, information related to resources selected based on the resource selection, wherein the active time may include time in which a first timer related to on-duration of the SL DRX configuration or a second timer of the SL DRX configuration is running.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: perform resource selection for resources included in active time of a sidelink (SL) discontinuous reception (DRX) configuration, based on a second UE performing SL communication based on the SL DRX configuration; and transmit, to the second UE, information related to resources selected based on the resource selection, wherein the active time may include time in which a first timer related to on-duration of the SL DRX configuration or a second timer of the SL DRX configuration is running.

According to an embodiment of the present disclosure, a non-transitory computer-readable storage medium storing instructions may be proposed. For example, the instructions, when executed, may cause a first device to: perform resource selection for resources included in active time of a sidelink (SL) discontinuous reception (DRX) configuration, based on a second device performing SL communication based on the SL DRX configuration; and transmit, to the second device, information related to resources selected based on the resource selection, wherein the active time may include time in which a first timer related to on-duration of the SL DRX configuration or a second timer of the SL DRX configuration is running.

Figure 18:
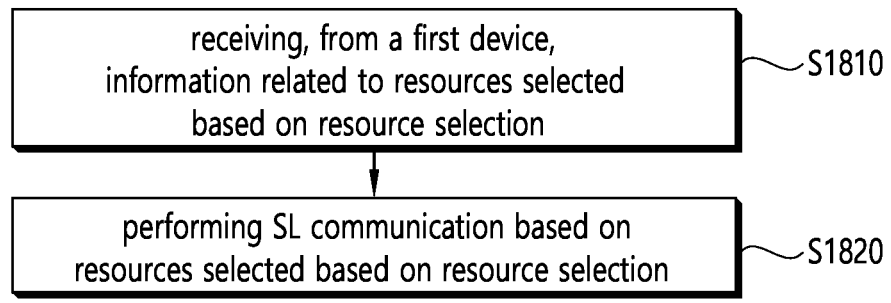
FIG. 18 shows a procedure for a second device to perform wireless communication according to an embodiment of the present disclosure.

FIG. 18 shows a procedure for a second device to perform wireless communication according to an embodiment of the present disclosure. The embodiment of FIG. 18 may be combined with various embodiments of the present disclosure.

Referring to FIG. 18, in step S1810, a second device performing wireless communication based on a sidelink (SL) discontinuous reception (DRX) configuration may receive, from a first device, information related to resources selected based on resource selection. In step S1820, the second device may perform sidelink (SL) communication based on the resources selected based on the resource selection. For example, the resource selection may be performed for resources included within active time of an SL discontinuous reception (DRX) configuration, based on the second device performing wireless communication based on the SL DRX configuration, and the active time may include time in which a first timer related to on-duration of the SL DRX configuration or a second timer of the SL DRX configuration is running.

For example, the resources selected based on the resource selection may include a first SL resource and a second SL resource, the first SL resource may be included within time duration in which the first timer is running, and the second SL resource may be included within time duration in which the first timer is not running, within the active time.

The above-described embodiment may be applied to various devices described below. For example, a processor 202 of a second device 200 may control a transceiver 206 to receive, from a first device 200, information related to resources selected based on resource selection. And, the processor 202 of the second device 200 may control the transceiver 206 to perform sidelink (SL) communication based on the resources selected based on the resource selection. For example, the resource selection may be performed for resources included within active time of an SL discontinuous reception (DRX) configuration, based on the second device performing wireless communication based on the SL DRX configuration, and the active time may include time in which a first timer related to on-duration of the SL DRX configuration or a second timer of the SL DRX configuration is running.

According to an embodiment of the present disclosure, a second device for performing wireless communication may be proposed. For example, the second device may comprise: one or more memories storing instructions; one or more transceivers; and one or more processors connected to the one or more memories and the one or more transceivers. For example, the one or more processors may execute the instructions to: receive, from a first device, information related to resources selected based on resource selection; and perform sidelink (SL) communication based on the resources selected based on the resource selection, wherein the resource selection may be performed for resources included within active time of an SL discontinuous reception (DRX) configuration, based on the second device performing wireless communication based on the SL DRX configuration, and wherein the active time may include time in which a first timer related to on-duration of the SL DRX configuration or a second timer of the SL DRX configuration is running.

For example, the resources selected based on the resource selection may include a first SL resource and a second SL resource, the first SL resource may be included within time duration in which the first timer is running, and the second SL resource may be included within time duration in which the first timer is not running, within the active time.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 19:
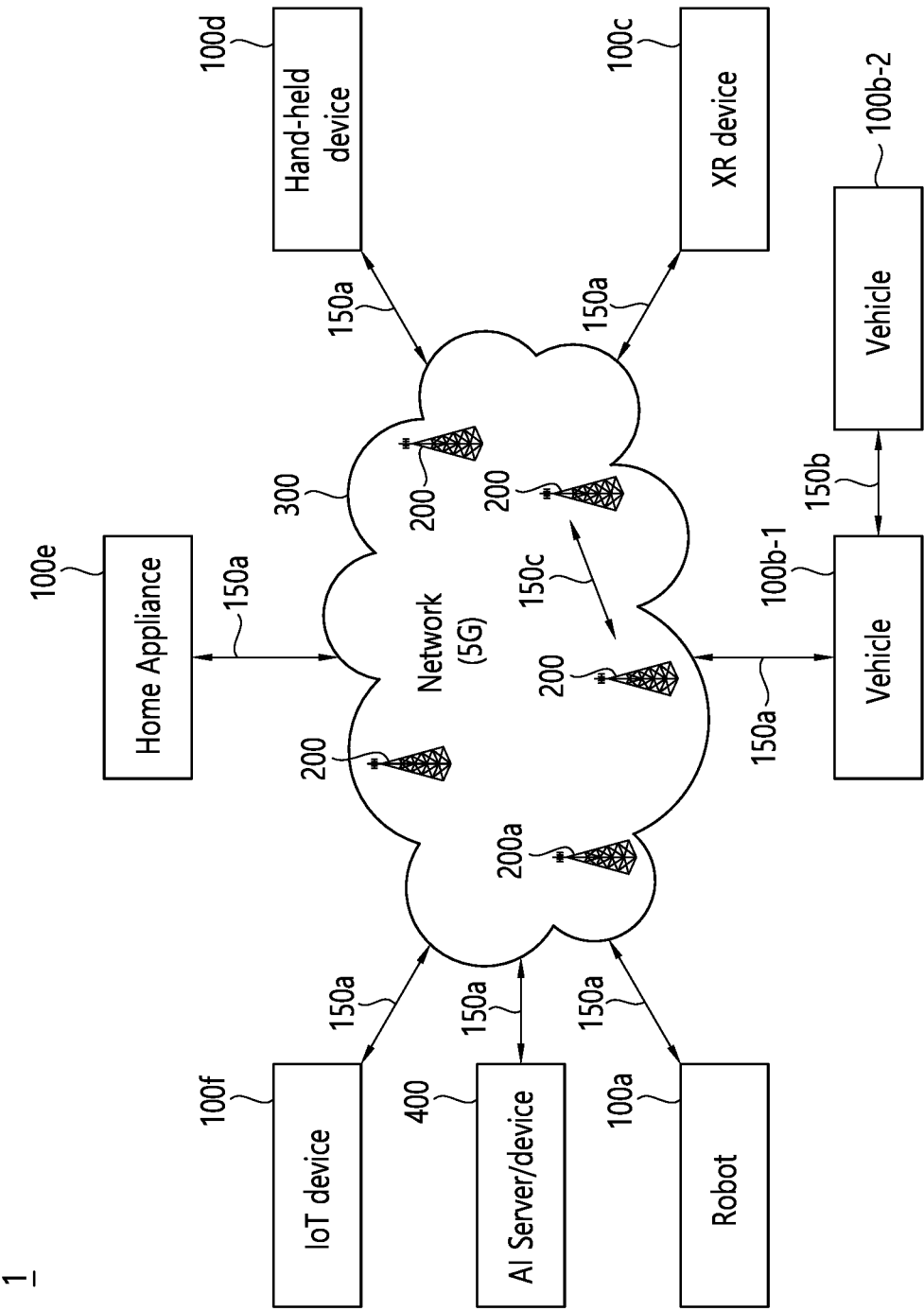
FIG. 19 shows a communication system 1, based on an embodiment of the present disclosure.

FIG. 19 shows a communication system 1, based on an embodiment of the present disclosure. The embodiment of FIG. 19 may be combined with various embodiments of the present disclosure.

Referring to FIG. 19, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 20:
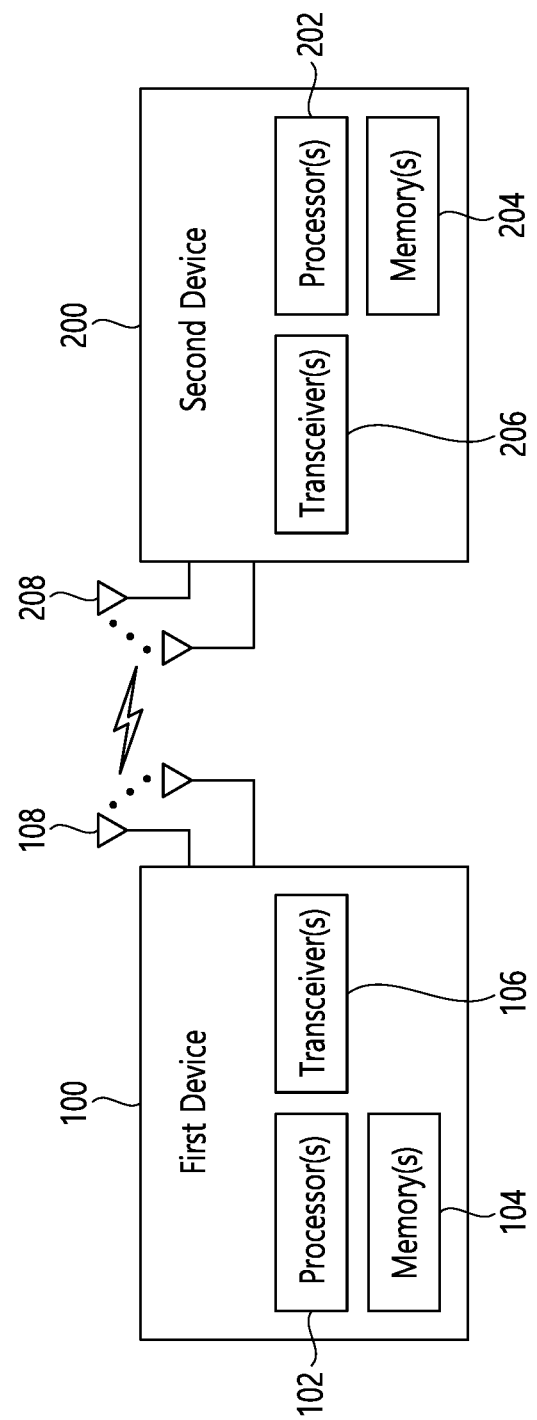
FIG. 20 shows wireless devices, based on an embodiment of the present disclosure.

FIG. 20 shows wireless devices, based on an embodiment of the present disclosure. The embodiment of FIG. 20 may be combined with various embodiments of the present disclosure.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 21:
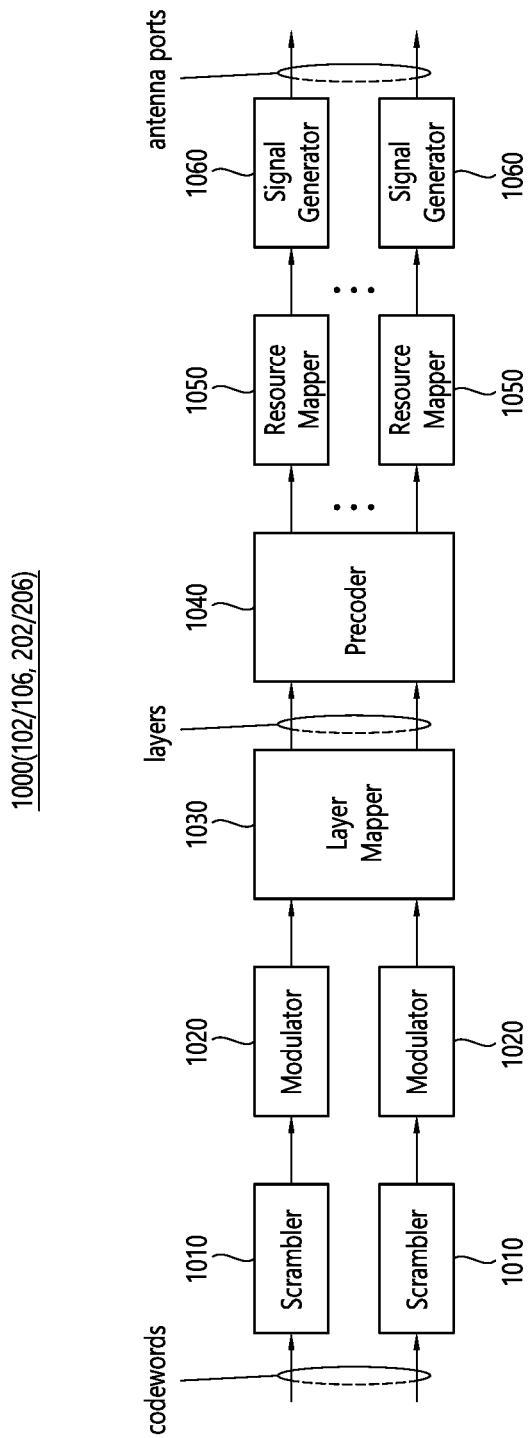
FIG. 21 shows a signal process circuit for a transmission signal, based on an embodiment of the present disclosure.

FIG. 21 shows a signal process circuit for a transmission signal, based on an embodiment of the present disclosure. The embodiment of FIG. 21 may be combined with various embodiments of the present disclosure.

Referring to FIG. 21, a signal processing circuit 1000 may include scramblers 1010, modulators 1020, a layer mapper 1030, a precoder 1040, resource mappers 1050, and signal generators 1060. An operation/function of FIG. 21 may be performed, without being limited to, the processors 102 and 202 and/or the transceivers 106 and 206 of FIG. 20. Hardware elements of FIG. 21 may be implemented by the processors 102 and 202 and/or the transceivers 106 and 206 of FIG. 20. For example, blocks 1010 to 1060 may be implemented by the processors 102 and 202 of FIG. 20. Alternatively, the blocks 1010 to 1050 may be implemented by the processors 102 and 202 of FIG. 20 and the block 1060 may be implemented by the transceivers 106 and 206 of FIG.

Codewords may be converted into radio signals via the signal processing circuit 1000 of FIG. 21. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 21. For example, the wireless devices (e.g., 100 and 200 of FIG. 20) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 22:
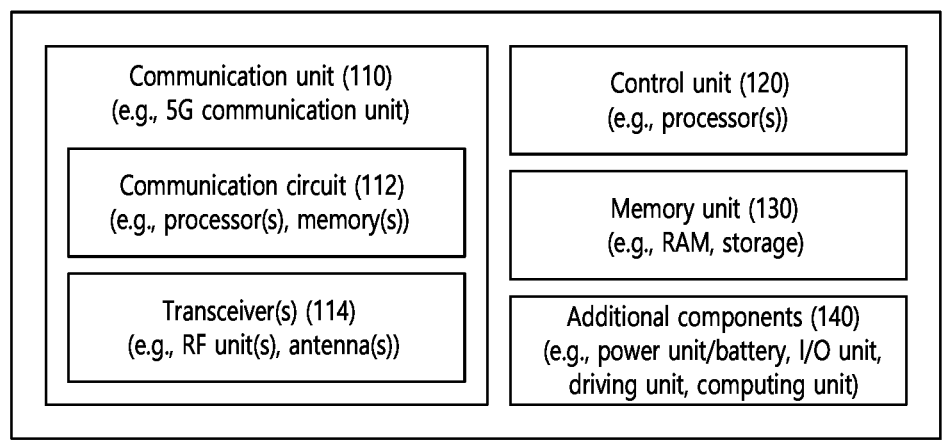
FIG. 22 shows another example of a wireless device, based on an embodiment of the present disclosure.

FIG. 22 shows another example of a wireless device, based on an embodiment of the present disclosure. The wireless device may be implemented in various forms according to a use-case/service (refer to FIG. 19). The embodiment of FIG. 22 may be combined with various embodiments of the present disclosure.

Referring to FIG. 22, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 19), the vehicles (100*b*-1 and 100*b*-2 of FIG. 19), the XR device (100*c* of FIG. 19), the hand-held device (100*d* of FIG. 19), the home appliance (100*e* of FIG. 19), the IoT device (100*f* of FIG. 19), a digital broadcast terminal, a hologram device, a public safety device, an MTC device, a medicine device, a fintech device (or a finance device), a security device, a climate/environment device, the AI server/device (400 of FIG. 19), the BSs (200 of FIG. 19), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 22 will be described in detail with reference to the drawings.

Figure 23:
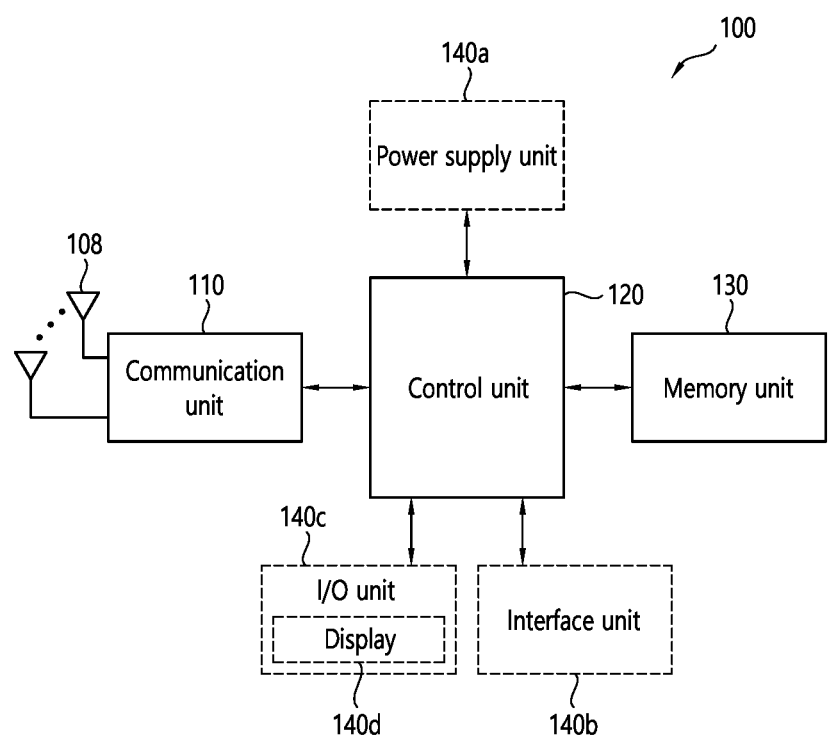
FIG. 23 shows a hand-held device, based on an embodiment of the present disclosure.

FIG. 23 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 23 may be combined with various embodiments of the present disclosure.

Referring to FIG. 23, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 22, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module. As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 24:
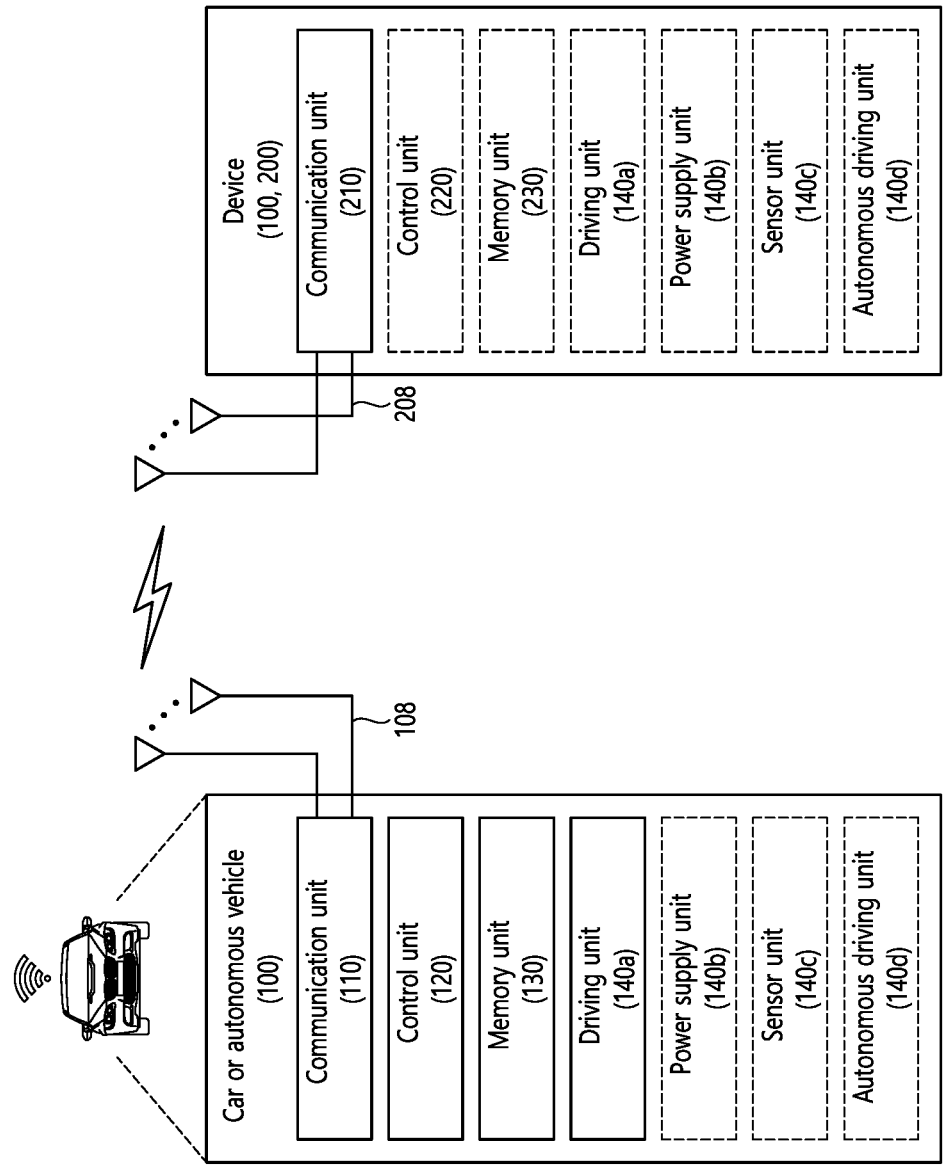
FIG. 24 shows a vehicle or an autonomous vehicle, based on an embodiment of the present disclosure.

FIG. 24 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 24 may be combined with various embodiments of the present disclosure.

Referring to FIG. 24, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 22, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first device, wireless communication, the method comprising:
   receiving, from a base station, information related to a physical uplink control channel (PUCCH) transmission occasion for sidelink (SL);
   receiving, from the base station, an SL grant related to the PUCCH transmission occasion, including a retransmission resource for a transmission to a second device;
   generating a medium access control (MAC) protocol data unit (PDU) to be retransmitted based on the SL grant;
   obtaining SL discontinuous reception (DRX) configuration of the second device;
   determining that the retransmission resource is not in an active time of the SL DRX configuration; and
   transmitting, to the base station, negative acknowledge (NACK) through the PUCCH transmission occasion.

2. The method of claim 1, wherein a priority value related to the NACK is the same as a priority value related to the MAC PDU.

3. The method of claim 1, wherein the second device is a power saving user equipment (UE).

4. The method of claim 1, wherein the retransmission of the MAC PDU is allowed based on a priority value related to the MAC PDU being smaller than a threshold.

5. The method of claim 4, wherein the retransmission of the MAC PDU is allowed based on congestion level of the retransmission resource being higher than threshold level and the priority value being smaller than the threshold.

6. The method of claim 1, further comprising:
   receiving, from the second device, the SL DRX configuration.

7. The method of claim 6, wherein the SL DRX configuration is an updated SL DRX configuration.

8. A first device for performing wireless communication, the first device comprising:
   one or more memories storing instructions;
   one or more transceivers; and
   one or more processors connected to the one or more memories and the one or more transceivers, wherein the one or more processors execute the instructions to:
   receive, from a base station, information related to a physical uplink control channel (PUCCH) transmission occasion for sidelink (SL);
   receive, from the base station, an SL grant related to the PUCCH transmission occasion, including a retransmission resource for a transmission to a second device;

generate a medium access control (MAC) protocol data unit (PDU) to be retransmitted based on the SL grant;
obtain SL discontinuous reception (DRX) configuration of the second device;
determine that the retransmission resource is not in an active time of the SL DRX configuration; and
transmit, to the base station, negative acknowledge (NACK) through the PUCCH transmission occasion.

9. A device adapted to control a first user equipment (UE), the device comprising:
one or more processors; and
one or more memories operably connectable to the one or more processors and storing instructions, wherein the one or more processors execute the instructions to:
receive, from a base station, information related to a physical uplink control channel (PUCCH) transmission occasion for sidelink (SL);
receive, from the base station, an SL grant related to the PUCCH transmission occasion, including a retransmission resource for a transmission to a second UE;
generate a medium access control (MAC) protocol data unit (PDU) to be retransmitted based on the SL grant;
obtain SL discontinuous reception (DRX) configuration of the second UE;
determine that the retransmission resource is not in an active time of the SL DRX configuration; and
transmit, to the base station, negative acknowledge (NACK) through the PUCCH transmission occasion.

* * * * *